United States Patent
Cheng

(10) Patent No.: US 12,440,565 B1
(45) Date of Patent: Oct. 14, 2025

(54) DENDRITIC CELL PREPARATION AND PREPARATION METHOD THEREOF

(71) Applicant: ZSKY BIOTECH INC., Beijing (CN)

(72) Inventor: Xudong Cheng, Beijing (CN)

(73) Assignee: ZSKY BIOTECH INC., Beijing (CN)

( * ) Notice: Subject to any disclaimer, the term of this patent is extended or adjusted under 35 U.S.C. 154(b) by 0 days.

(21) Appl. No.: 18/901,784

(22) Filed: Sep. 30, 2024

(30) Foreign Application Priority Data

May 28, 2024 (CN) .......................... 202410674814.7
May 28, 2024 (CN) .......................... 202410675731.X

(51) Int. Cl.
| | |
|---|---|
| *A61K 40/42* | (2025.01) |
| *A61K 40/19* | (2025.01) |
| *A61P 35/00* | (2006.01) |
| *C12N 5/0784* | (2010.01) |

(52) U.S. Cl.
CPC ............ *A61K 40/428* (2025.01); *A61K 40/19* (2025.01); *A61P 35/00* (2018.01); *C12N 5/0639* (2013.01); *C12N 2501/22* (2013.01); *C12N 2501/2304* (2013.01); *C12N 2501/25* (2013.01); *C12N 2501/51* (2013.01); *C12N 2501/52* (2013.01); *C12N 2502/30* (2013.01)

(58) Field of Classification Search
CPC ... A61K 40/19; C12N 5/0639; C12N 2501/52
See application file for complete search history.

(56) References Cited

U.S. PATENT DOCUMENTS

| | | | | |
|---|---|---|---|---|
| 2012/0308607 | A1* | 12/2012 | Goletz .................. | A61K 40/24 435/372 |
| 2015/0368612 | A1* | 12/2015 | Palucka ......... | A61K 39/464838 435/325 |
| 2022/0016164 | A1 | 1/2022 | Aerts et al. | |
| 2023/0355760 | A1 | 11/2023 | Manting et al. | |

FOREIGN PATENT DOCUMENTS

| | | | | |
|---|---|---|---|---|
| CN | 1582165 | * | 2/2005 | ............. C07K 16/28 |
| CN | 108379569 | | 8/2018 | |
| CN | 112703004 | | 4/2021 | |
| CN | 113613673 | | 11/2021 | |
| CN | 116948967 | | 10/2023 | |
| CN | 117624372 | * | 3/2024 | ............. C07K 16/16 |
| WO | 2016/064899 | | 4/2016 | |

OTHER PUBLICATIONS

Healey et al. Immunomonitoring of a phase I/II study of AGS-003, a dendritic cell immunotherapeutic, as first-line treatment for metastatic renal cell carcinoma. J. Clin. Onc., 28, No. 15_suppl,, 2010, meeting abstract e13006. (Year: 2010).*
Gonzales-Cao et al. A phase 1b/2 study of autologous dendritic cell vaccination in combination with atezolizumab in patients with small cell lung cancer (SCLC). J. Thor. Oncol. 16, issue 10S, p. S970, PF14.01, 2021. (Year: 2021).*
Sun et al. Blockade of PD-L1 enhances cancer immunotherapy by regulating dendritic cell maturation and macrophage polarization. Cancers, 11, 1400, 2019. (Year: 2019).*
Nava, Sara et al., "An Optimized Method for Manufacturing a Clinical Scale Dendritic Cell-Based Vaccine for the Treatment of Glioblastoma", PLOS ONE, Dec. 2012, vol. 7, Issue 12, pp. 1-7.
Ridolfi, Laura et al., "Complementary vaccination protocol with dendritic cells pulsed with autologous tumour lysate in patients with resected stage III or IV melanoma: protocol for a phase II randomised trial (ACDC Adjuvant Trial)", BMJ Open, 2018, vol. 8, pp. 1-6.

* cited by examiner

*Primary Examiner* — Elly-Gerald Stoica
(74) *Attorney, Agent, or Firm* — Wenderoth, Lind & Ponack, L.L.P.

(57) ABSTRACT

The present application discloses a novel dendritic cell preparation and a preparation method thereof. The cell preparation comprises PD-L1 negative dendritic cells and/or dendritic cells with CD40 agonists bound to the cell surface. The preparation method comprises: blocking and/or activating dendritic cells with a treatment agent, wherein the treatment agent comprises PD-L1 antibodies and/or CD40 agonists. The specific method includes adding the treatment agent to block and/or activate dendritic cells either during the dendritic cell culture stage or after completion of the culture. The dendritic cell preparation provided by the present application has enhanced maturity, improved antigen presentation, and a superior capacity to activate and amplify antigen-specific T cells compared to conventional dendritic cells, and has broad application prospects in the field of cancer immunotherapy.

17 Claims, 11 Drawing Sheets

Specification includes a Sequence Listing.

SEQUENCE LISTING

```
Sequence total quantity: 4
SEQ ID NO: 1            moltype = AA  length = 215
FEATURE                 Location/Qualifiers
source                  1..215
                        mol_type = protein
                        organism = synthetic construct
SEQUENCE: 1
DIQMTQSPSS LSASVGDRVT IKCQASQSIS SRLAWYQQKP GKPPKLLIYR ASTLASGVPS   60
RFSGSGSGTD FTLTISSLQP EDVATYYCQC TGYGISWPIG GGTKVEIKRT VAAPSVFIFP  120
PSDEQLKSGT ASVVCLLNNF YPREAKVQWK VDNALQSGNS QESVTEQDSK DSTYSLSSTL  180
TLSKADYEKH KVYACEVTHQ GLSSPVTKSF NRGEC                            215

SEQ ID NO: 2            moltype = AA  length = 447
```

```
FEATURE                 Location/Qualifiers
source                  1..447
                        mol_type = protein
                        organism = synthetic construct
SEQUENCE: 2
QVQLVESGGG VVQPGRSLRL SCAASGFSFS STYVCWVRQA PGKGLEWIAC IYTGDGTNYS     60
ASWAKGRFTI SKDSSKNTVY LQMNSLRAED TAVYFCARPD ITYGFAINFW GPGTLVTVSS    120
ASTKGPSVFP LAPCSRSTSE STAALGCLVK DYFPEPVTVS WNSGALTSGV HTFPAVLQSS    180
GLYSLSSVVT VPSSSLGTQT YTCNVDHKPS NTKVDKRVES KYGPPCPPCP APEFEGGPSV    240
FLFPPKPKDT LMISRTPEVT CVVVDVSQED PEVQFNWYVD GVEVHNAKTK PREEQFNSTY    300
RVVSVLTVLH QDWLNGKEYK CKVSNKGLPS SIEKTISKAK GQPREPQVYT LPPCQEEMTK    360
NQVSLWCLVK GFYPSDIAVE WESNGQPENN YKTTPPVLDS DGSFFLYSRL TVDKSRWQEG    420
NVFSCSVMHE ALHNHYTQKS LSLSLGK                                        447

SEQ ID NO: 3            moltype = AA  length = 226
FEATURE                 Location/Qualifiers
source                  1..226
                        mol_type = protein
                        organism = synthetic construct
SEQUENCE: 3
QVQLVQSGAE VKKPGASVKV SCKASGYTFT SYWMHWVRQA PGQGLEWMGR IGPNSGFTSY     60
NEKFKNRVTM TRDTSTSTVY MELSSLRSED TAVYYCARGG SSYDYFDYWG QGTTVTVSSA    120
SVAAPSVFIF PPSDRKLKSG TASVVCLLNN FYPREAKVQW KVDNALQSGN SQESVTEQDS    180
KDSTYSLSST LTLSKADYEK HKVYACEVTH QGLSSPVTKS FNRGEC                   226

SEQ ID NO: 4            moltype = AA  length = 438
FEATURE                 Location/Qualifiers
source                  1..438
                        mol_type = protein
                        organism = synthetic construct
SEQUENCE: 4
DIVLTQSPAS LAVSPGQRAT ITCRASESVS IHGTHLMHWY QQKPGQPPKL LIYAASNLES     60
GVPARFSGSG SGTDFTLTIN PVEAEDTANY YCQQSFEDPL TFGQGTKLEI KASTKGPSVF    120
PLAPCSRSTS ESTAALGCLV EDYFPEPVTV SWNSGALTSG VHTFPAVLQS SGLYSLSSVV    180
TVPSSSLGTQ TYTCNVDHKP SNTKVDEKVE SKYGPPCPPC PAPEFEGGPS VFLFPPKPKD    240
TLMISRTPEV TCVVVDVSQE DPEVQFNWYV DGVEVHNAKT KPREEQFNST YRVVSVLTVL    300
HQDWLNGKEY KCKVSNKGLP SSIEKTISKA KGQPREPQVC TLPPSQEEMT KNQVSLSCAV    360
KGFYPSDIAV EWESNGQPEN NYKTTPPVLD SDGSFFLVSR LTVDKSRWQE GNVFSCSVMH    420
EALHNHYTQK SLSLSLGK                                                  438
```

DENDRITIC CELL PREPARATION AND PREPARATION METHOD THEREOF

TECHNICAL FIELD

The present application pertains to the field of somatic cell therapy and discloses a novel dendritic cell preparation with the ability to activate and amplify T cells, and a preparation method thereof.

CROSS REFERENCING

The present application claims the rights of Chinese patent application CN2024106748147 filed on May 28, 2024, and Chinese patent application CN202410675731X filed on May 28, 2024, the contents of which are incorporated herein by reference.

SEQUENCE LISTING FILE SIMULTANEOUSLY SUBMITTED

The entire content of the following XML file is incorporated herein by reference: a sequence listing in computer-readable format (CRF) (name: TFH01057PCT Sequence listing.xml, date: 20240708, size: 5.56 KB).

BACKGROUND

Immunotherapy is a rapidly advancing field of medical research today, with somatic cell therapy, an emerging treatment method, playing an important role. The basic principle of somatic cell therapy involves obtaining specific types of cells from the patient's body, culturing and processing them in vitro to acquire special biological functions, and ultimately transfusing these modified active cells back into the patient's body to achieve the desired therapeutic effect. Among various immune cell therapies, dendritic cells (DCs) are extensively used in tumor immunotherapy, infectious disease prevention and treatment, and the autoimmune diseases management due to their superior antigen presentation capability.

Dendritic cells, a type of antigen presenting cells (APCs), were discovered by Canadian scholar Steinman in 1973, and named due to their numerous dendritic or pseudopodial-like protrusions that protrude upon mature. Dendritic cells are widely distributed in the blood, liver, spleen, lymph nodes, and other non-immune organ tissues. They are the most potent known professional antigen presenting cells (APCs) and the only APC capable of stimulating naive T cell responses. Dendritic cells activate the T cell immune response by efficiently capturing and processing exogenous antigens, and interacting with T cells through surface antigen-presenting molecules. As a central component in initiating and regulating the immune system, dendritic cells play a critical role in maintaining the immune response.

The preparation of dendritic cell-based therapeutics is a key technology. The commonly employed method involves isolating monocytes from the patient's peripheral blood, followed by in vitro induction, culture, and activation to enhance antigen presentation function, and finally, these activated dendritic cells are transfused back into the patient's body. Since the number of dendritic cells in human body is extremely limited, comprising less than 1% of white blood cells in peripheral blood, isolating dendritic cells from the body is both time-consuming and labor-intensive, yielding only a small quantity. This limitation poses challenges in meeting large-scale clinical demands, thus necessitating in vitro induction and cultivation. However, there are still some shortcomings in the existing preparation methods, such as:

1. Current induction culture methods have problems such as low cell yield, poor cell viability, and limited efficiency in stimulating T cells. Dendritic cells often fail to achieve sufficient activation and maturation during in vitro culture, resulting in insufficient antigen presentation capacity and reduced effectively stimulating T cell immune responses.
2. Existing antigen-loading methods require optimization to improve the efficiency of dendritic cells in capturing and processing antigens, and enhance their capacity to stimulate T cells.
3. The standard protocol for in vitro culture of dendritic cells is not yet unified, and there are differences in the culture conditions and process parameters used by different laboratories and clinical centers, which affects the quality controllability of the preparation.

Recent research has revealed that dendritic cells express high levels of PD-L1 on their surface. These PD-L1 molecules bind to the B7.1 molecule of dendritic cells, leading to functional defects in dendritic cells and inhibiting their capacity to activate T cells.

Studies have further shown that CD40 is a co-stimulatory factor and protein receptor present on antigen presenting cells (APCs). Upon CD40 binding to CD154 (also known as CD40L) on helper T cells, antigen presenting cells are activated and triggering a series of downstream reactions. The expression of CD40 on monocytes, macrophages, dendritic cells, and B cells plays an important role in immune cell function and anti-tumor immunity.

Therefore, the development of dendritic cell preparations with stronger activity, T cell activation capability, and antigen presentation function, as well as stable dendritic cell culture methods, is currently a research focus.

SUMMARY

Given the aforementioned technical challenges, the applicant has provided the present application.

The applicant provides a novel dendritic cell preparation with enhanced functionality, developed through an improved dendritic cell preparation method, which enhances the maturity and antigen presentation ability of dendritic cells, as well as the ability to activate and amplify T cells.

Specifically, the technical solution disclosed in the present application provides a novel dendritic cell preparation comprising PD-L1 negative dendritic cells and/or dendritic cells with CD40 agonists bound to the cell surface.

Further, the proportion of PD-L1 negative dendritic cells in the cell preparation is ≥80% of the total cells, and/or the proportion of dendritic cells with CD40 agonists bound to the cell surface is ≥80% of the total cells in the preparation.

Further, the proportion of dendritic cells with mature cell phenotype is ≥50% of the total cells in the preparation. Preferably, the proportion is ≥80%.

Further, each proportion of CD80, CD86, HLA-DR, and CD83 positive cells is ≥50% of the total cells in the preparation. Preferably, the proportion is ≥80%.

Further, the proportion of CD14 positive cells is ≤20% of the total cells in the preparation. Preferably, the proportion is ≤10%.

Further, the sum of proportions of CD3, CD19, and CD56 positive cells is ≤20% of the total cells in the preparation. Further preferably, the sum of proportions is ≤10%. Further preferably, the sum of proportions is ≤5%.

Further, the surface of PD-L1 negative dendritic cells in the preparation is bound to PD-L1 antibodies.

Further, the PD-L1 antibody is selected from a PD-L1 monoclonal antibody or a multispecific antibody targeting PD-L1.

Further preferably, the PD-L1 antibody is selected from a monoclonal antibody Atezolizumab, Adebrelimab, Durvalumab, or Avelumab.

Further, the CD40 agonist is selected from a CD40 agonist antibody or a CD40 ligand, wherein the CD40 agonist antibody comprises a CD40 monoclonal antibody and a multispecific antibody targeting CD40, and the CD40 ligand comprises a CD40L recombinant protein or a fusion protein.

Further preferably, the CD40 agonist is selected from a CD40 agonist antibodies.

Further preferably, the CD40 agonist antibody is selected from monoclonal antibodies Mitazalimab, Cifurtilimab, Sotigalimab, or bispecific antibody Tecaginlimab (targeting CD40 and 4-1BB).

Further, the dendritic cells are derived from human peripheral blood monocytes.

Further, the dendritic cells in the preparation of the present application are further loaded with a tumor neoantigen or a tumor associated antigen.

Further, the preparation of the present application further comprises a cell cryopreservation solution, a cell protectant, or a pharmaceutically acceptable carrier.

The technical solution of the present application further provides a method for preparing dendritic cells, comprising: blocking and/or activating dendritic cells using a treatment agent comprising PD-L1 antibodies and/or CD40 agonists.

Further, the blocking treatment includes blocking dendritic cells with PD-L1 antibodies, and the activation treatment includes activating dendritic cells with CD40 agonists.

Further, the PD-L1 antibody is selected from a PD-L1 monoclonal antibody or a multispecific antibody targeting PD-L1.

Further preferably, the PD-L1 antibody is selected from monoclonal antibodies Atezolizumab, Adebrelimab, Durvalumab, or Avelumab.

Further, the CD40 agonist is selected from a CD40 agonist antibody or CD40 ligand, wherein the CD40 agonist antibody comprises a CD40 monoclonal antibody or a multispecific antibody targeting CD40, and the CD40 ligand comprises a CD40L recombinant protein or a fusion protein.

Further preferably, the CD40 agonist is a CD40 agonist antibody.

Further preferably, the CD40 agonist antibody is selected from monoclonal antibodies Mitazalimab, Cifurtilimab, Sotigalimab, or bispecific antibody Tecaginlimab.

Further, a working concentration of the PD-L1 antibody is 1-50 μg/mL, and/or a working concentration of the CD40 agonist is 0.1-10 μg/mL.

Further preferably, a working concentration of the PD-L1 antibody is 10-20 g/mL, and/or a working concentration of the CD40 agonist is 1-5 μg/mL.

Further, the blocking and/or activation treatment comprises a step of adding the treatment agent to the dendritic cells and co-incubating them; preferably the co-incubation condition is: a temperature of 35-38° C., and 5% $CO_2$.

Further, the preparation method further comprises a maturation promoting culture step of dendritic cells.

Further, the dendritic cells are subjected to blocking and/or activation treatment during or after the maturation, preferably, the blocking and/or activation treatment is performed 1 to 6 hours before completion of the culture.

Further, the preparation method further comprises a step of loading a tumor neoantigen or a tumor associated antigen onto the dendritic cells.

Further, the dendritic cells are loaded with tumor neoantigen or tumor associated antigen before the blocking and/or activation treatment.

Further, the dendritic cells subjected to the blocking and/or activation treatment are PD-L1 negative and/or dendritic cells with CD40 agonists bound to the cell surface.

Further, the dendritic cell preparation prepared by the preparation method of the present application, wherein the proportion of the PD-L1 negative dendritic cells is ≥80% of the total cells in the preparation, and/or the proportion of the dendritic cells with CD40 agonists bound to the cell surface is ≥80% of the total cells in the preparation.

Further, the present application also provides use of the dendritic cell preparation in prevention, treatment, and postoperative recurrence prevention of cancer diseases.

Further, the cancer disease includes solid tumor cancer or blood cancer; preferably, the solid tumor cancer includes breast cancer, ovarian cancer, pancreatic cancer, lung cancer, liver cancer, nasopharyngeal cancer, gastric cancer, colorectal cancer, kidney cancer, bladder cancer, prostate cancer, sarcoma, esophageal cancer, cervical cancer, gallbladder cancer, glioblastoma or melanoma, and the blood cancer includes leukemia, lymphoma and multiple myeloma.

Further, in the use of the prevention, treatment, and postoperative recurrence prevention of cancer diseases, the dendritic cell preparation can be used in combination with radiochemotherapy or immunotherapy drugs.

Further preferably, the dendritic cell preparation can be used in combination with temozolomide (TMZ) and/or immune checkpoint inhibitors.

TECHNICAL EFFECT

The technical solution of the present application involves a novel dendritic cell preparation by co-culturing PD-L1 monoclonal antibody (or multispecific antibody comprising PD-L1 antibody), CD40 agonist monoclonal antibody (or multispecific antibody comprising CD40 antibody or CD40L recombinant protein), and dendritic cells. On the one hand, PD-L1 antibody effectively blocks the PD-L1 molecules on the surface of dendritic cells, releasing the co-stimulatory molecule B7.1 on dendritic cells, which significantly enhancing the ability of dendritic cells to stimulate CD28 molecules on T cells, thereby activating T cells and preventing their functional exhaustion, and increasing the capacity of dendritic cells to activate T cells. Concurrently, CD40 agonist antibodies bind to CD40 on the surface of dendritic cells, inducing higher levels of co-stimulatory molecules expression and enhancing cytokine secretion. This promotes dendritic cell maturation and activation, and improving their antigenic cross presentation capabilities.

The injection developed based on the technical solution of the present application stimulates the activation and amplification of antigen-specific T lymphocytes in cancer patients, enabling the recognition and elimination of cancer cells by activated T lymphocytes. This provides therapeutic benefits in cancer treatment and prevention of postoperative recurrence. The injection demonstrates high clinical safety and significant anti-cancer and cancer prevention functions, and has broad application prospects in the field of cancer immunotherapy.

DETAILED DESCRIPTION

Figure 1:
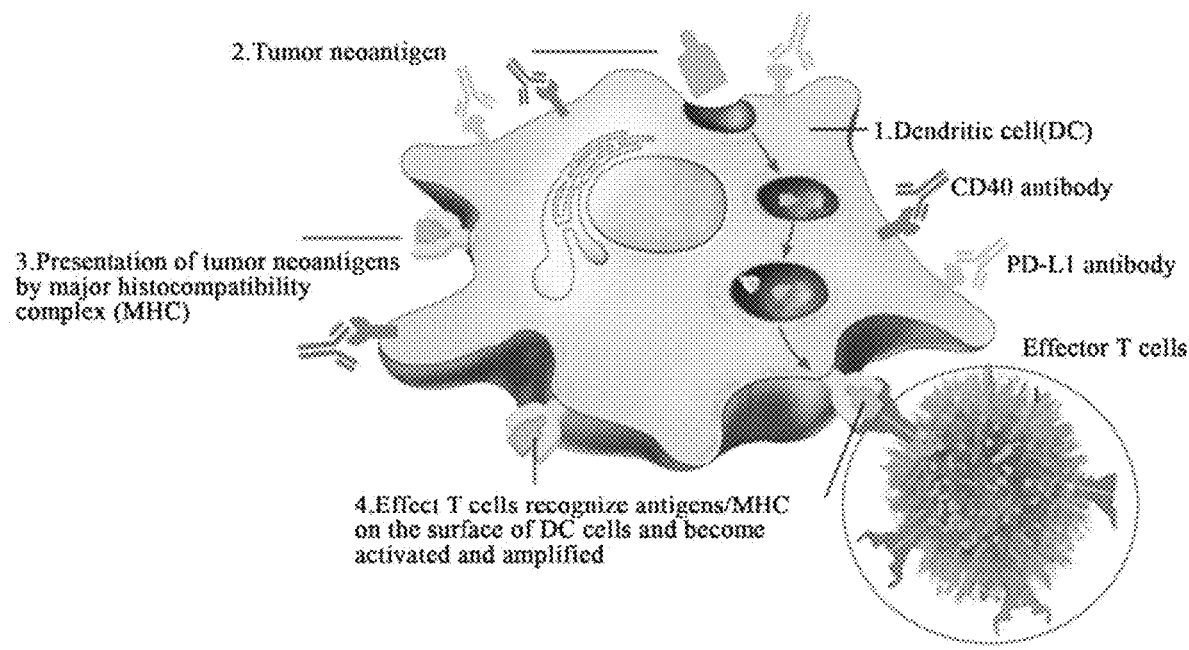
FIG. 1 shows a schematic diagram of the structure of a mature dendritic cell loaded with tumor neoantigen and bound to a CD40 monoclonal antibody and a PD-L1 monoclonal antibody.

The following provides a detailed description and explanation of the implementation method of the present application through specific embodiments, but the following content should not be understood as any limitation on the present application. The technical terms mentioned in this specification have the same meaning as those commonly understood by those skilled in the art. In case of any conflict, the definition in this specification shall prevail. Under the inspiration of the present application, those ordinary skilled in the art can make various forms without departing from the protection scope of the purpose and claims of the present application, all of which fall within the scope of protection of the present application.

Secondly, the "examples" or "specific embodiments" hereafter refer to specific features, structures, or characteristics that can be included in at least one embodiment of the present application. The term "in one example" or "in one embodiment" used in different parts of this specification does not necessarily refer to the same example or embodiment, nor is it a separate or selective example or embodiment that is mutually exclusive with other examples or embodiments. The preferred embodiment of the present application described in the following specification is intended for the general principles of the specification and is not intended to limit the scope of the present application. The protection scope of the present application shall be determined by the attached claims.

The present application relates to a dendritic cell preparation comprising PD-L1 negative dendritic cells and/or dendritic cells with CD40 agonists bound to the cell surface.

In specific embodiments, the proportion of PD-L1 negative dendritic cells in the cell preparation is ≥80% of the total cells. For example, the proportion of PD-L1 negative cells is ≥81%, 82%, 83%, 84%, 85%, 86%, 87%, 88%, 89%, 90%, 91%, 92%, 93%, 94%, 95%, 96%, 97%, 98% or 99%; and/or the proportion of dendritic cells with CD40 agonists bound to the cell surface is ≥80% of the total cells in the preparation. For example, the proportion of cells with CD40 agonists bound to the cell surface is ≥81%, 82%, 83%, 84%, 85%, 86%, 87%, 88%, 89%, 90%, 91%, 92%, 93%, 94%, 95%, 96%, 97%, 98% or 99%.

In specific embodiments, the PD-L1 negative dendritic cells are dendritic cells with PD-L1 antibodies bound to the cell surface.

In specific embodiments, the PD-L1 antibody is selected from PD-L1 monoclonal antibody or multispecific antibody targeting PD-L1.

In some specific embodiments, the PD-L1 monoclonal antibody is selected from monoclonal antibodies Atezolizumab, Adebrelimab, Durvalumab, or Avelumab.

In specific embodiments, the CD40 agonist is selected from CD40 agonist antibodies or CD40 ligands, wherein the CD40 agonist antibodies include CD40 monoclonal antibodies and multispecific antibodies targeting CD40, and the CD40 ligands include CD40L recombinant proteins or fusion proteins.

In some specific embodiments, the CD40 agonist is selected from CD40 monoclonal antibodies Mitazalimab, Cifurtilimab, Sotigalimab, or bispecific antibody Tecaginlimab.

In specific embodiments, the dendritic cells are dendritic cells that bind PD-L1 antibody and CD40 agonist on the cell surface, or dendritic cells that bind PD-L1 and CD40 bispecific antibody, or dendritic cells that bind multispecific antibody targeting PD-L1 and CD40.

In specific embodiments, the dendritic cells are derived from human peripheral blood monocytes.

In a specific embodiment, in the preparation provided by the present application, the proportion of CD80, CD86, HLA-DR, or CD83 positive cells to the total cells in the preparation is ≥50%, preferably ≥80%.

In a specific embodiment, in the preparation provided by the present application, the proportion of CD14 positive cells to the total cells in the preparation is ≤20%, preferably ≤10%.

In a specific embodiment, in the preparation provided by the present application, the sum proportion of CD3, CD19, and CD56 positive cells to the total cells in the preparation is ≤20%, preferably ≤10%, and further preferably ≤5%.

In specific embodiments, the dendritic cells in the preparation may also be loaded with a tumor neoantigen and/or a tumor associated antigen.

In a specific embodiment, tumor antigens can be loaded during the maturation promoting phase of monocyte culture. The methods of loading antigens include but are not limited to adding antigen polypeptides or electroporation of mRNAs encoding antigens.

In specific embodiments, the preparation of the present application further comprises a cell cryopreservation solution, a cell protectant, or a pharmaceutically acceptable carrier.

In the present application, those skilled in the art can fully understand that any cell cryopreservation solution can be used to preserve the preparation of the present application. Those skilled in the art can choose based on existing commercially available cell cryopreservation solutions, or choose based on literature reports, or prepare using commercially available cell cryopreservation solutions themselves. Those skilled in the art can fully understand that any cell protectant can be used to preserve the preparation of the present application. Those skilled in the art can choose based on existing commercially available cell protectants, choose based on literature reports, or prepare using commercially available cell protectants themselves.

In some specific embodiments, the preparation of the present application comprises a cell cryopreservation solution and a cell protectant, wherein the composition of the cell cryopreservation solution and cell protectant is 40-90% CryoStor® CS10 cryopreservation solution+5~30% human serum albumin solution+5~30% NaCl injection.

The present application also relates to a method for preparing dendritic cells, comprising: blocking and/or activating dendritic cells with a treatment agent comprising PD-L1 antibody and/or CD40 agonist.

In specific embodiments, the PD-L1 antibody is selected from PD-L1 monoclonal antibodies or multispecific antibodies targeting PD-L1.

In specific embodiments, the CD40 agonist is selected from CD40 agonist antibodies or CD40 ligands, wherein the CD40 agonist antibodies include CD40 monoclonal antibodies and multispecific antibodies targeting CD40, and the CD40 ligands include CD40L recombinant proteins or fusion proteins.

In specific embodiments, the treatment agent includes PD-L1 antibodies and CD40 agonists. For example, the treatment agent can consist of one of the following combinations: PD-L1 monoclonal antibodies with CD40 agonist monoclonal antibodies, bispecific antibodies or multispecific antibodies targeting CD40 or CD40L recombinant proteins; or PD-L1 and CD40 bispecific antibodies; multispecific antibodies targeting PD-L1, CD40, and other sites; or a combination of bispecific antibodies or multispecific antibodies targeting PD-L1 with CD40 monoclonal antibodies or CD40L recombinant proteins.

In some specific embodiments, the PD-L1 monoclonal antibody is selected from monoclonal antibodies Atezolizumab, Adebrelimab, Durvalumab, or Avelumab.

In some specific embodiments, the CD40 agonists are selected from CD40 monoclonal antibodies Mitazalimab, Cifurtilimab, Sotigalimab, or bispecific antibody Tecaginlimab.

The PD-L1 antibody, CD40 agonist antibody, CD40 ligand, and other agents described in the present application can be obtained by purchasing commercially available products (e.g., monoclonal antibodies Atezolizumab and Mitazalimab), or can be synthesized by those skilled in the art according to conventional methods.

In specific embodiments, the working concentration of the PD-L1 antibody is ≥1 μg/mL, preferably 1-50 μg/mL, further preferably 10-20 μg/mL, such as 10, 11, 12, 13, 14, 15, 16, 17, 18, 19 or 20 μg/mL.

In specific embodiments, the working concentration of the CD40 agonist is ≥0.1 g/mL, preferably 0.1-10 μg/mL, further preferably 1-5 μg/mL, such as 1, 1.5, 2, 2.5, 3, 3.5, 4, 4.5 or 5 μg/mL.

In specific embodiments of the present application, the blocking and/or activation treatment comprises the step of adding a treatment agent such as PD-L1 antibodies and/or CD40 agonists to dendritic cells and co-incubating them.

In some specific embodiments, the co-incubation condition is at the temperature of 35-38° C. and 5% $CO_2$. In a specific embodiment, the co-incubation condition is at the temperature of 37° C. and 5% $CO_2$.

In the embodiments of the present application, the preparation method further comprises a step of maturation promoting culture of the dendritic cells. Further preferably, the blocking and/or activation treatment is performed on mature dendritic cells prior to completion of the culture.

In specific embodiments, mature dendritic cells for use in the dendritic cell preparation of the present application or for use in the preparation method of the present application can be obtained through the following methods:

Mature dendritic cells were obtained by culturing monocytes from human peripheral blood or CD34+ progenitor cells from human bone marrow or umbilical cord blood, using serum-free medium in combination with a differentiation promoting cytokine composition and a maturation promoting cytokine composition.

The serum-free culture medium used in the present application has no specific brand or ingredient restrictions, and any common serum-free culture medium in the art can be used. Serum comprises various plasma proteins, polypeptides, carbohydrates, growth factors, hormones, etc. Due to the complexity and variability of serum components between batches, consistency of ingredients cannot be guaranteed. In addition, while serum contains many beneficial ingredients for cell growth, it also includes potentially harmful ingredients, such as complement, antibodies, endotoxins, etc. Consequently, cells cultured with high concentration serum are not suitable for clinical use, as this increases the risk of clinical allergies. In contrast serum-free culture medium has no adverse effects on the growth, differentiation, morphology, and function of dendritic cells.

In a specific embodiment, the serum-free culture medium used is a culture medium with explicit chemical ingredients and without animal derived ingredients. The manufacturing process, ingredient testing, and release of the product comply with GMP guidelines and can be used for in vitro preparation of clinical grade dendritic cell drugs.

After obtaining the progenitor cells, the cells are suspended in serum-free medium at a concentration of $1\text{-}5\times10^6$ cells/mL, and the differentiation promoting cytokine composition of rhGM-CSF (recombinant human granulocyte-macrophage colony stimulating factor) and rhIL-4 (recombinant human interleukin 4) are added. The specific composition can be referred to reference 1 [Laura Ridolfi, Francesco de Rosa, Laura Fiammenghi et al. Complementary vaccination protocol with dendritic cells pulsed with autologous tumour lysate in patients with resected stage III or IV melanoma: protocol for a phase II randomised trial (ACDC Adjuvant Trial). [J]. BMJ Open, 2018, 8(8)]. The cell suspension is transferred into a culture flask and cultured in a 37° C., 5% $CO_2$ incubator for 2-3 days before being supplemented with culture medium. The culture is continued for 2-3 days to obtain immature dendritic cells (imDCs). Then, the imDCs are induced into mature DC cells using a maturation promoting cytokine composition (conventional maturation promoting cytokine compositions are used, including but not limited to rhGM-CSF, rhIL-4, rhTNF-α, etc.). In specific embodiment, the maturation promoting cytokine composition can adopt the composition described in the above literature.

In specific embodiments, the dendritic cells are subjected to the blocking and/or activation treatment during or after the maturation promoting culture process. In a specific embodiment, the treatment is performed 1 to 6 hours prior to completion of the culture.

In the embodiments of the present application, the preparation method further comprises the step of loading a tumor neoantigen or a tumor associated antigen onto the dendritic cells.

In a specific embodiment, the antigen is loaded before the blocking and/or activation treatment (immature dendritic cell stage). The methods of loading antigens include but are not limited to adding antigen polypeptides to the cell culture system or electroporation mRNA encoding an antigen into the dendritic cells.

In a specific embodiment, the tumor neoantigen polypeptides are dissolved according to their respective solubility properties and added to the imDC cell suspension for co-incubation and culture.

Figure 18:
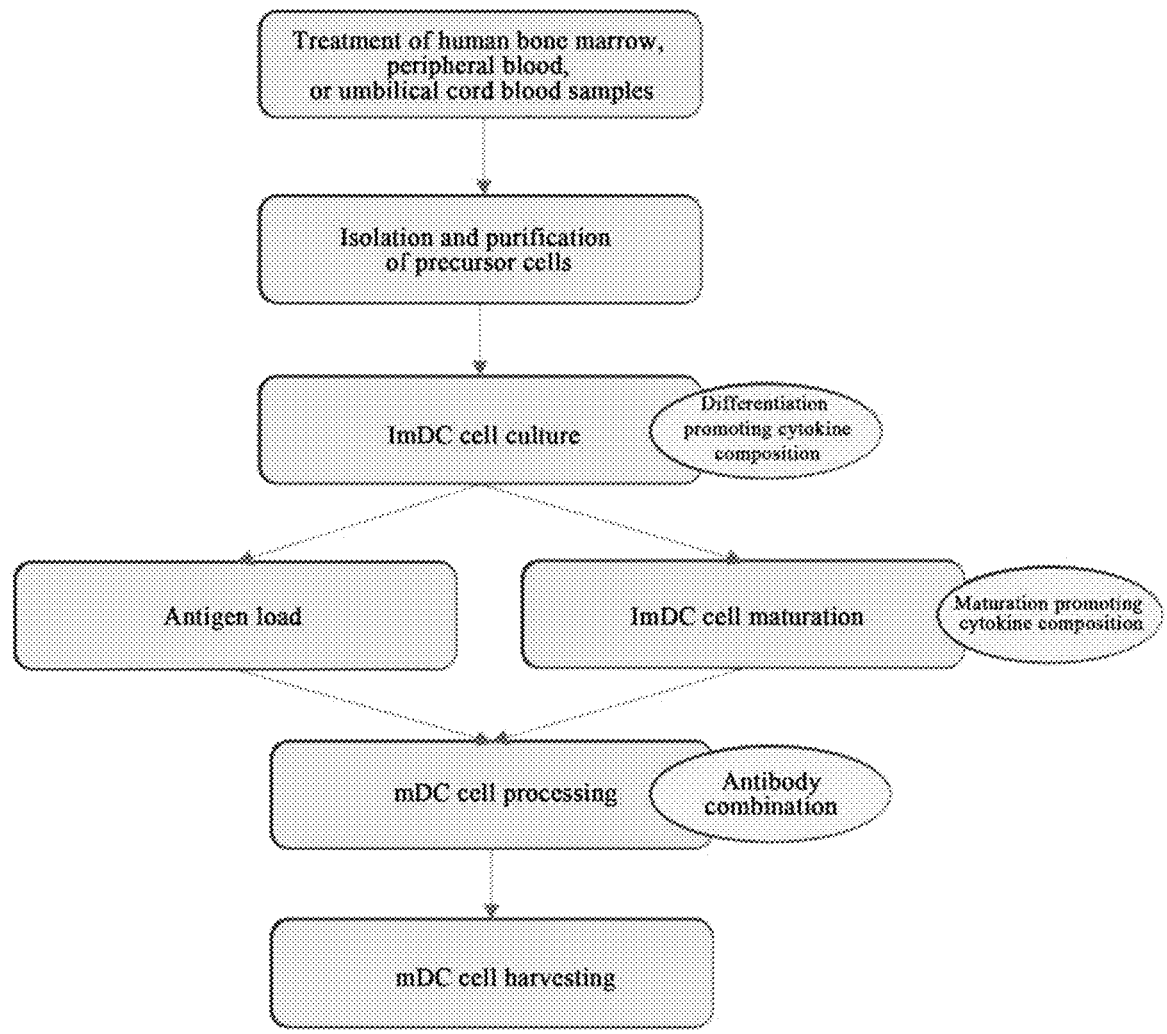
FIG. 18 shows a flowchart of the method for preparing the dendritic cells provided by the present application.

FIG. 18 is the flowchart of a specific embodiment of the method for preparing dendritic cells provided by the present application. The main steps include:
1. Monocytes from human peripheral blood or CD34+ progenitor cells from human bone marrow or umbilical cord blood are cultured in serum-free medium in combination with a differentiation promoting cytokine composition and a maturation promoting cytokine composition;
2. Antigens are loaded during the immature dendritic cell stage by adding antigen polypeptides to the cell culture system or electroporation of mRNA encoding an antigen into the dendritic cells;
3. The dendritic cells that have been loaded with antigens and before completion of maturation promoting culture are co-cultured with PD-L1 antibody (or multispecific antibody targeting PD-L1) and CD40 agonist antibody (or multispecific antibody targeting CD40), then the cells are harvested.

In specific embodiments of the present application, the dendritic cells subjected to the blocking and/or activation treatment are PD-L1 negative and/or with CD40 agonists bound to the cell surface.

In a specific embodiment, the dendritic cell preparation provided by the present application is prepared by the following method:

Monocytes from humans are cultured in serum-free medium in combination with the differentiation promoting cytokine composition and the maturation promoting cytokine composition to obtain dendritic cells with mature phenotypes;

Optionally, during the maturation promoting stage, tumor neoantigens or tumor associated antigens can be loaded, ways for antigen loading include but are not limited to adding antigen polypeptides or electroporation of mRNA encoding an antigen;

Dendritic cells with mature phenotypes and loaded with antigens are co-cultured with CD40 agonist antibody and/or PD-L1 antibody (or multispecific antibody targeting at least one of PD-L1 and CD40);

Optionally, the treated cells are washed, purified and suspended in a cell cryoprotectant to obtain dendritic cell preparations.

The positive/negative expression levels of molecular markers such as PD-L1, CD80, CD86, HLA-DR, CD83, CD14, CD3, CD19, CD56, and the binding rate of CD40 agonists in the present application can be determined by conventional cellular and molecular biology detection methods in the art. For example, the expression levels of molecular markers such as PD-L1, CD80, CD86, HLA-DR, CD83, CD14, CD3, CD19, and CD56 on the surface of the dendritic cells, as well as binding rate of the CD40 agonists, can be determined by detection methods such as flow cytometry (FACS), immunofluorescence (IF), immunohistochemistry (IHC), enzyme-linked immunosorbent assay (ELISA), and Western blot. Those skilled in the art can also use other appropriate detection methods to determine. There are no restrictions in the present application. Furthermore, the above detection methods can also be used to determine various functional indicators of the dendritic cells.

For example, in the present application, flow cytometry (FACS) can be used to detect the proportion of PD-L1 positive cells in the dendritic cell preparation of the present application, and then subtract the number of PD-L1 positive cells from the total number of cells to calculate the proportion of PD-L1 negative cells. Of course, those skilled in the art can also understand that based on the different methods used, the proportion of PD-L1 negative cells in the cell preparations can be directly detected.

In the present application, flow cytometry (FACS) can be used to detect the number of cells in the dendritic cell preparation that have surface-bound CD40 agonists, and further calculate their proportion in the cell preparation.

In a specific embodiment, immunofluorescence (IF) can be used to detect the number of PD-L1 positive cells in the preparation, as well as the number of cells that have surface-bound CD40 agonists, and further calculate the proportion of PD-L1 negative cells to the total cells in the preparation and the proportion of cells that have surface-bound CD40 agonists to the total cells in the preparation.

In a specific embodiment, cell surface enzyme-linked immunosorbent assay (ELISA) can be used to detect the number of PD-L1 positive cells in the preparation, as well as the number of cells that have surface-bound CD40 agonists, and further calculate the proportion of PD-L1 negative cells to the total cells in the preparation and the proportion of cells that have surface-bound CD40 agonists to the total cells in the preparation.

In specific embodiments of the present application, flow cytometry is used to detect the proportion of PD-L1 and CD40 molecules on the surface of dendritic cells bound to their respective antibodies. For CD40, the binding level of antibody is directly detected by fluorescently labeled anti-human IgG antibodies; while for PD-L1, the binding level of PD-L1 antibody is indirectly detected by detecting the unblocked PD-L1 sites on the cell surface using fluorescently labeled PD-L1 antibodies.

In a specific embodiment of the present application, the flow cytometry detection method used is as follows:

The sample cells are added to PBS, washed and centrifuged, after which the supernatant is discarded. The cells are then resuspended in PBS to the appropriate concentration. A dead/live cell stain is added, and mixed well, incubated at room temperature in dark for 10 minutes. After incubation, PBS is added, followed by centrifugation, washing and discarding the supernatant. Cells are resuspended in Cell Staining Buffer, and the appropriate flow cytometry antibodies are added to the tubes of each group (as described in the method section of reference 2 [Sara Nava, Marta Dossena, Simona Pogliani, et al. An optimized method for manufacturing a clinical scale dendritic cell-based vaccine for the treatment of glioblastoma. [J]. PLoS One, 2012, 7:12.]). The mixture is vortexed and incubated in the dark at room temperature for 30 minutes. After incubation, PBS is added to each tube and mixed, centrifuged, washed and the cells are resuspended. The samples are analyzed by flow cytometry to determine the positive rates of various cell surface markers such as CD80, CD86, HLA-DR, CD83, CD3/CD56/CD19, CD14, PD-L1, and the binding rate of cells bound with CD40 agonists. In the present application, there are no specific limitations on the flow cytometer used.

Figure 2:
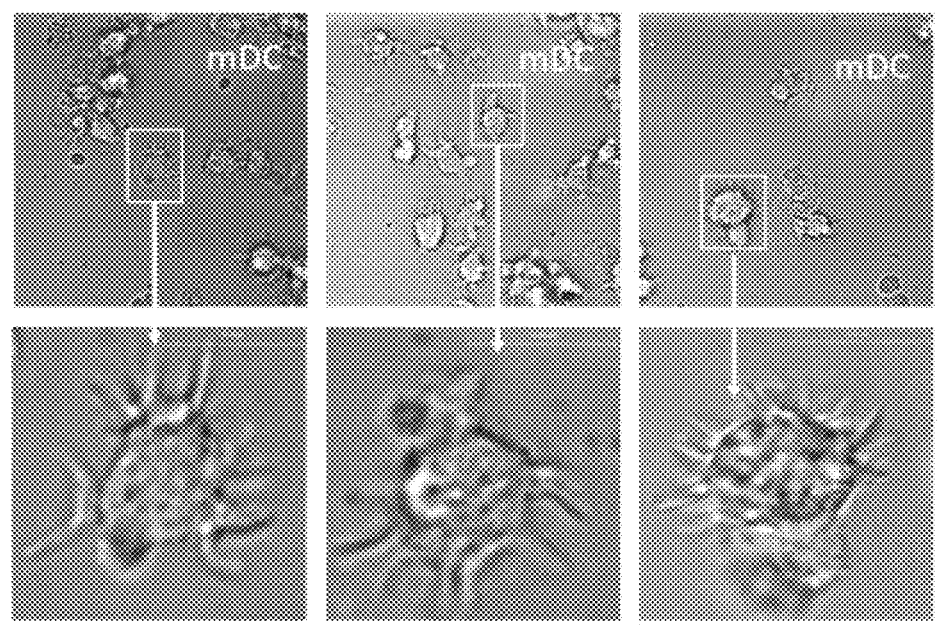
FIG. 2 shows the morphological images of dendritic cells observed under confocal microscopy from multiple batches of the present application.
Figure 3:
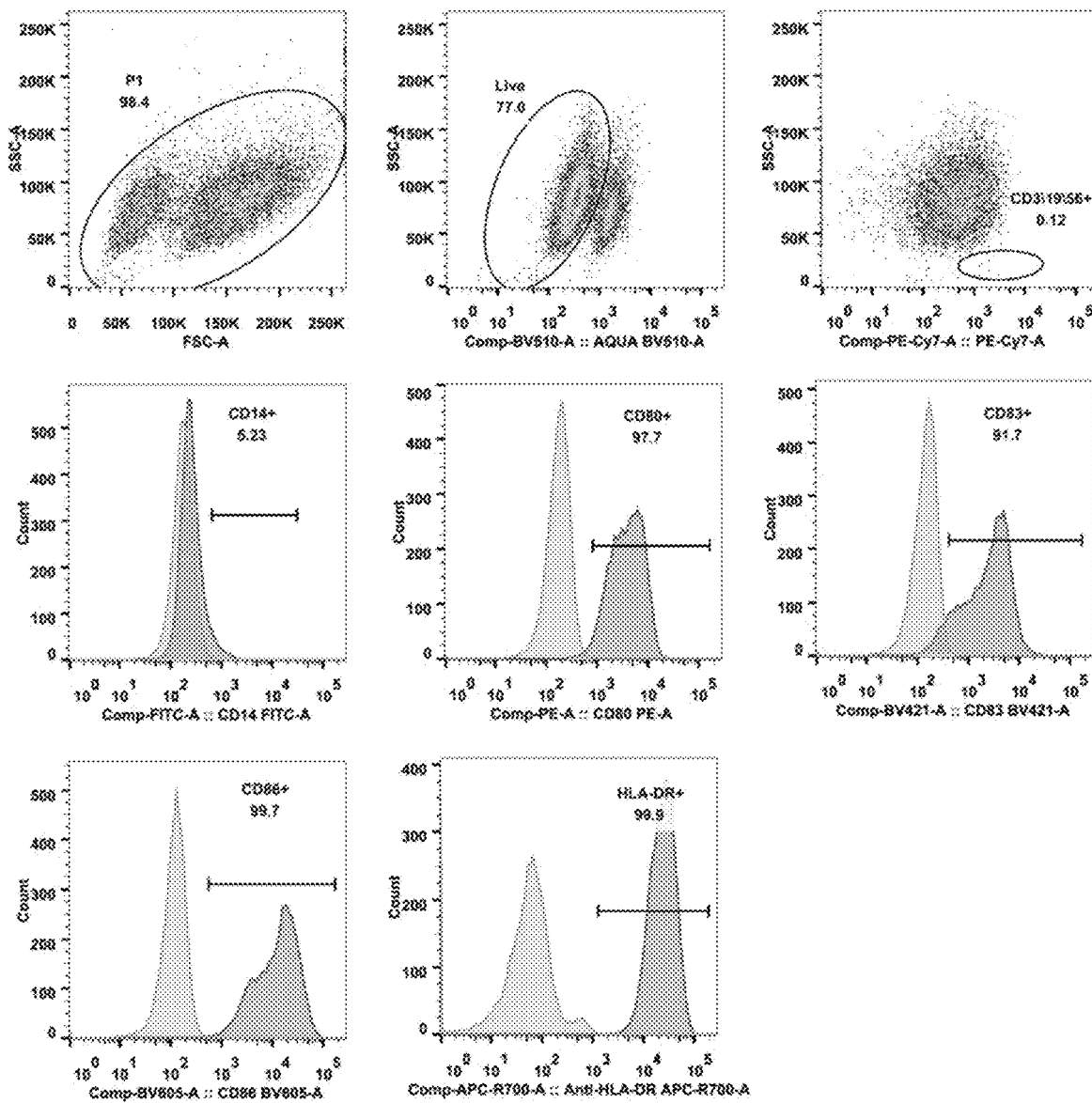
FIG. 3 shows the detection results of molecular markers related to the dendritic cells of the present application detected by flow cytometry.

FIG. 1 shows a schematic diagram of the structure of mature dendritic cells loaded with tumor neoantigen and bound with CD40 monoclonal antibody and PD-L1 monoclonal antibody provided in a specific embodiment of the present application. FIG. 2 shows the microscopic morphology of dendritic cells in a specific dendritic cell injection provided in a specific embodiment of the present application. It can be seen that the novel dendritic cell is star shaped or polygonal in shape, with a diameter between 10-20 μm, and there are many spiky protrusions on the cell surface. FIG. 3 shows the flow cytometry results of the cell preparation provided in a specific embodiment of the present application, showing that the positive rates of dendritic cell maturation markers such as CD80, CD86, HLA-DR, or CD83 on the cell surface are all ≥50%, preferably ≥80%.

Figure 4:
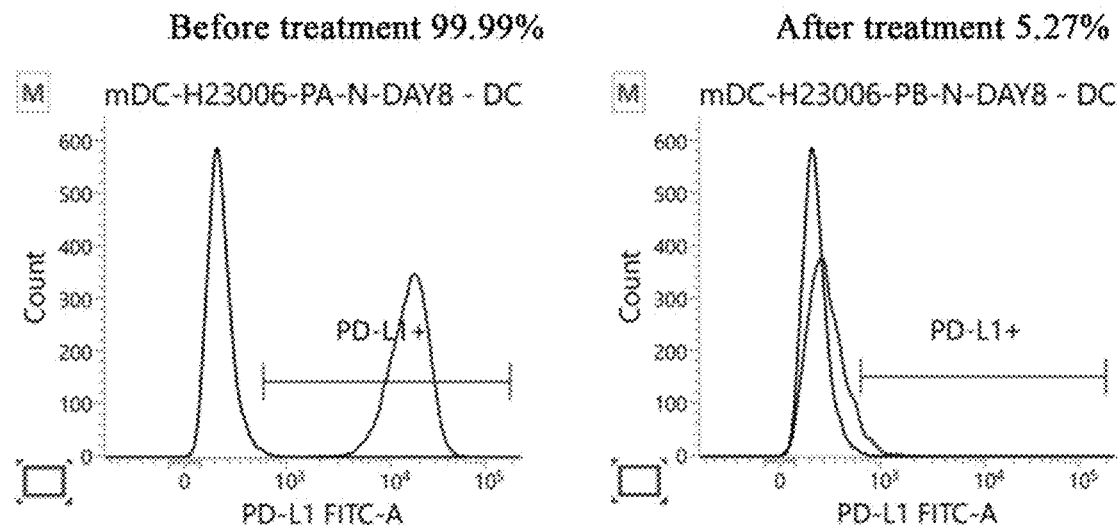
FIG. 4 shows the result of changes in PD-L1 positivity rate in dendritic cells blocked with PD-L1 monoclonal antibodies.
Figure 5:
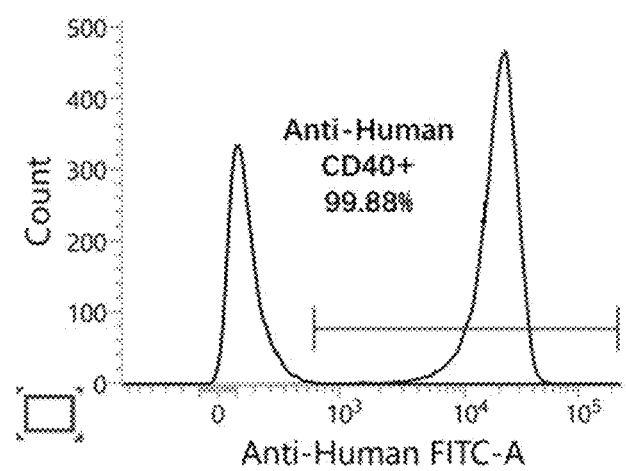
FIG. 5 shows the detection results of CD40 antibody positivity rate on the surface of dendritic cells treated with CD40 monoclonal antibody.

For the dendritic cell preparation provided by the present application, the expression of PD-L1 molecular markers on the surface of dendritic cells is detected by flow cytometry. Preferably, the proportion of PD-L1 positive dendritic cells is reduced to ≤20% (i.e., the PD-L1 antibody blocking efficiency is ≥80%). In a specific embodiment, the dendritic cell PD-L1 positivity rate blocked with PD-L1 monoclonal antibody decreases from 99.99% before treatment to 5.27% after treatment (as shown in FIG. 4), indicating that the PD-L1 site is effectively blocked. At the same time, the proportion of CD40 molecules bound to CD40 antibody on the surface of dendritic cells is detected by flow cytometry. Preferably, the proportion of dendritic cells bound with CD40 monoclonal antibody or multispecific antibody targeting CD40 increases to ≥80%. In a specific embodiment, the CD40 antibody positivity rate on the surface of dendritic cells treated with CD40 monoclonal antibody significantly increases, from 0% before treatment to 99.88% after treatment (as shown in FIG. 5).

Figure 6:
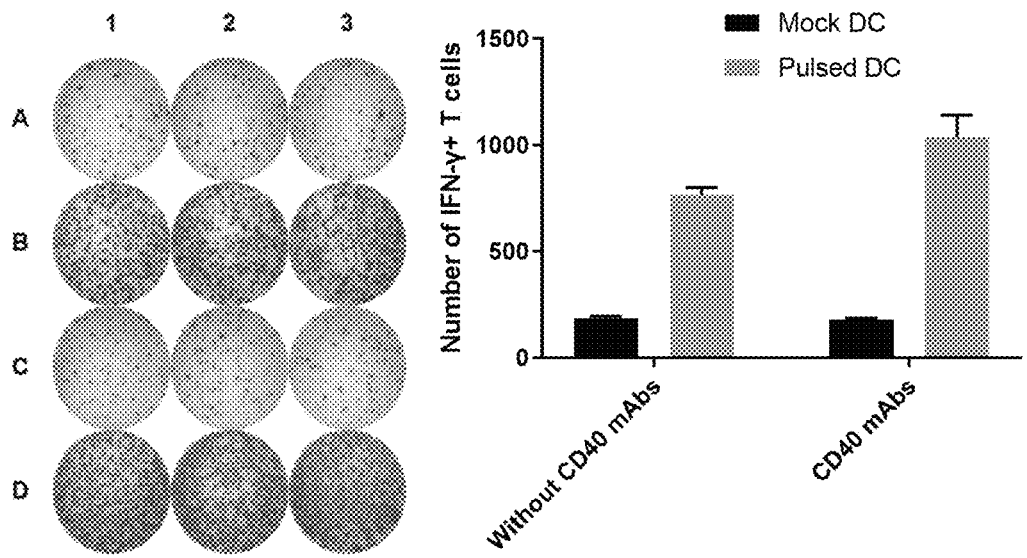
FIG. 6 shows the result of changes in the number of T cells stimulated by dendritic cells activated by CD40 monoclonal antibody to secrete IFN-γ.

In addition, the ability of antigen-specific T cells activated by dendritic cells (T cells secreting IFN-γ cytokines are considered antigen-specific T cells activated by dendritic cells) is detected using the classic Elispot method (enzyme-linked immunospot). The number of activated T cells stimulated by dendritic cells activated by CD40 monoclonal antibody is 35.5% higher than that in the untreated group (as shown in FIG. 6).

Compared with conventional dendritic cells, the innovation of the present application lies in co-culturing dendritic cells with mature cell phenotypes and loaded with antigens with CD40 agonists and/or PD-L1 antibodies (or multispecific antibody comprising at least one of CD40 and PD-L1 antibodies), followed by washing, purification, and cryopreservation to obtain a dendritic cell injection with strong anti-cancer/cancer prevention effects. Preferably, the ingredients of the cryoprotectant for dendritic cells are 40-90% CryoStor® CS10 cryopreservation solution+5~30% human serum albumin solution+5~30% NaCl injection. Preferably, the proportion of PD-L1 negative dendritic cells is ≥80%, and the proportion of dendritic cells bound with CD40 agonists is ≥80%.

Compared with the conventional culture method of dendritic cells, the present application innovatively adds PD-L1 antibody (or multispecific antibody targeting PD-L1) and CD40 agonists (including CD40 agonist monoclonal antibody or multispecific antibody targeting CD40 or CD40L recombinant proteins, etc.) to enhance the function of dendritic cells during the preparation stage of dendritic cells. On one hand, it blocks the PD-L1 molecules on the surface of mature dendritic cells, enhancing the ability of dendritic cells to activate T cells; on the other hand, it activates CD40 receptors on the surface of dendritic cells, increases the expression of co-stimulatory molecules and antigen presentation efficiency, and enhances their ability to stimulate and activate T cells.

In order to further demonstrate the ability of dendritic cells in the present application to activate naive antigen-specific T cells (CTL cells), as well as the ability of activated CTL cells to specifically recognize and kill tumor target cells, the following experiments are designed for verification:

KLE, a human endometrial carcinoma cell line expressing $p53^{R175H}$ neoantigen (HMTEVVRHC), is used as the target cell, and CFPAC-1, a human pancreatic cancer cell line not expressing the neoantigen, is used as the negative control cell (both cell lines are HLA-A*02:01 subtype). ImDC cells cultured from healthy donor monocytes of the same HLA subtype are used to prepare Neo-DC cells (mature dendritic cells loaded with $p53^{R175H}$ neoantigen polypeptide during the maturation promoting stage and treated with CD40 and PD-L1 antibodies) and Mock DC cells (mature dendritic cells loaded with the same but not treated with PD-L1 and CD40 monoclonal antibodies as a control), respectively. CD8+T cells from the same healthy donor are stimulated in vitro for 10 days using Neo-DC and Mock DC cells to obtain $p53^{R175HT}$ T cells and control T cells. The composition of the CD8+ T cells obtained from in vitro stimulation is analyzed using flow cytometry, and the killing effect of these cells on target cells and negative control tumor cells is evaluated. The experimental results confirm that, Neo-DC cells exhibit superior induction of CD8+T cell activation compared to Mock DC cells, generating antigen-specific T cells (CTL cells) with a higher proportion of effector memory T cell subpopulations. These CTL cells have a strong ability to kill tumor cells.

In order to evaluate the anti-tumor effect of dendritic cells in the tumor model of humanized huPBMC-NCG mice subcutaneously transplanted with human pancreatic cancer cell CFPAC-1, the following experiment is designed: CFPAC-1 cells in logarithmic growth phase is collected and subcutaneously inoculated into huPBMC-NCG mice. When the average volume of tumors in mice reaches a predefined volume, the mice are randomly divided into 3 groups (G1-G3) based on their body weight and tumor volume, with 6 mice in each group. Each mouse is injected intraperitoneally with 100 μL PBMC of HLA-A*02:01 subtype for humanized immune system reconstruction. The day of injection is set as day D0. At the same time, monocytes from the same donor source are used to prepare Neo-DC cells (mature dendritic cells loaded with neoantigen polypeptide generated by human pancreatic cancer cell $KRAS^{G12V}$ mutation and treated with CD40 antibody and PD-L1 antibody) and Mock DC cells (mature dendritic cells loaded with the same neoantigen polypeptide but not treated with CD40 antibody and PD-L1 antibody) according to the cell preparation process of the present application. The vehicle is injected subcutaneously into the mice in G1 group that have completed immune reconstitution as a control; Mock DC cells are injected subcutaneously into the mice in G2 group; the same dose of Neo-DC cells are injected subcutaneously into the mice in G3 group. The administration method is subcutaneous two-point injection in the groin area of the hind legs of mice, with an administration frequency on D14, D18, D22, and D30 after completing immune reconstitution, for a total of 4 doses. The pharmacodynamic evaluation of the test substance in the tumor model of humanized huPBMC-NCG mice with subcutaneous transplantation of human pancreatic cancer cell CFPAC-1 is comprehensively assessed based on the observation indicators such as changes in tumor volume, body weight, as well as CBA analysis, GvHD scoring, and peripheral blood immune cell detection results during and after administration. The experimental results finally show that repeated subcutaneous injections of Neo-DC cells and Mock DC cells in human PBMC reconstituted immunodeficiency mice (at the same time, human pancreatic cancer cells are subcutaneously tumorigenic) both have an effect on tumor lesion growth inhibition, and there are significant statistical differences compared with the vehicle control, and the effect of Neo-DC cells is more significant than that of Mock DC cells on tumor growth inhibition. This indicates that subcutaneous injection of Neo-DC cells has a stronger effect on inhibiting and treating human pancreatic cancer lesions in humanized huPBMC-NCG mice.

Human clinical trials are carried out using one or more of the several injection single drugs of Neo-DC cell injection in the present application, or combined with PD-1 antibodies, PD-L1 antibodies, temozolomide, etc., and the results show that Neo-DC cell injection has good clinical safety, and whether used alone or in combination with other drugs, it has certain clinical efficacy for patients with pancreatic cancer, liver cancer, and glioblastoma.

The above indicates that the Neo-DC cell injection of the present application has good anti-cancer and cancer prevention activity, as well as clinical accessibility, and has broad application prospects in the field of immunotherapy for cancer and other diseases; and it can be used alone or in combination with PD-1 antibodies, PD-L1 antibodies, temozolomide and other radiochemotherapy drugs for clinical treatment of cancer or postoperative recurrence prevention. The cell drugs and/or combination drugs of the present application can be applied to solid tumors such as breast cancer, ovarian cancer, pancreatic cancer, lung cancer, liver cancer, nasopharyngeal cancer, gastric cancer, colorectal cancer, renal cancer, bladder cancer, prostate cancer, sarcoma, esophageal cancer, cervical cancer, gallbladder cancer, glioblastoma or melanoma, as well as blood cancers such as leukemia, lymphoma and multiple myeloma. Compared with the existing traditional dendritic cell culture methods, the present application significantly improves the maturity, antigen presentation ability, and the ability to activate specific T cells, by adding PD-L1 antibodies and/or CD40 agonists during the dendritic cell culture process, thereby enhancing their anti-cancer and cancer prevention effects in clinical practice.

Examples

The present application provides a general and/or specific description of the materials and testing methods used in the experiments. In the following examples, unless otherwise specified, % represents volume percentage. The reagents or instruments used without specifying the manufacturer are all conventional reagent products that can be commercially obtained. The imDC cells and mDC cells are respectively immature dendritic cells and mature dendritic cells cultured using the methods described in Example 1 and Example 2 of the present application. The Neo-DC cells described in the present application are mature dendritic cells loaded with corresponding antigens cultured using the method described in Example 6 of the present application.

Example 1: Preparation of Monocytes and Culture Method of imDC Cells (Immature Dendritic Cells)

The culture method of imDC cells includes four steps: apheresis or peripheral blood acquisition, PBMC separation and purification, monocyte sorting and purification, and imDC cell culture.

1. Apheresis or Peripheral Blood Acquisition

On the day of collection or the day before, donors were screened for routine blood count, coagulation and infectious disease to confirm that the donors had no active infectious diseases such as hepatitis B, hepatitis C, syphilis and HIV, etc. Select the white blood cell mode on the blood cell separator for apheresis or direct intravenous collection of peripheral blood. After transporting the collected blood samples to the laboratory, the blood samples that had been preliminarily confirmed to be qualified would proceed to the next step of cell sorting, strictly following aseptic procedures.

2. PBMC Separation and Purification

The day on which the blood samples were processed was designated as Day 0 of the culture. Plasma was separated from the blood sample, and an appropriate amount of PBS solution was pipetted to the blood cell sample. The diluted blood was slowly loaded onto the Ficoll solution surface and centrifuged for 30 minutes. After centrifugation, the white membrane layer was carefully transferred into a new centrifuge tube using a pipette. PBS was added to dilute and mix the sample, followed by centrifugation and washing. The cell pellet was then resuspended in sorting buffer to obtain PBMC suspension.

3. Monocyte Sorting and Purification

Using MACS technology for sorting the monocytes, the specific purification process was as follows:

Based on the PBMC cell count obtained in the previous step, the cells were adjusted to the appropriate concentration using a sorting buffer. CD14 magnetic beads were added, mixed thoroughly, and incubated in a 2-8° C. for 15 minutes. Following incubation, 10-20 mL of buffer per $1\times10^8$ cells was added, mixed well and centrifuged. The supernatant was discarded, buffer was added to resuspend the cells, and the volume was adjusted before centrifuging again. After discarding the supernatant, the cells were resuspended in the buffer and mixed thoroughly. The cell sorting column was placed in the sorting magnetic rack, rinsed with buffer, and the cell suspension was applied to the sorting column at a uniform rate. Once all the cell suspensions had passed through, the column was washed with buffer and removed from the magnetic rack. CD14+cells were collected from the column effluent, centrifuged, and resuspended in a serum-free culture medium to obtain the CD14+monocyte suspension. The cell concentration and viability were then measured.

4. Obtaining imDC Through Monocyte Differentiation Promoting Culture

The monocyte suspension obtained from the above steps was adjusted to a concentration of $1-5 \times 10^6$ cells/mL using the serum-free culture medium. Recombinant human GM-CSF (rhGM-CSF) and recombinant human IL-4 (rhIL-4) were added as differentiation-promoting cytokines. The cell suspension was transferred to a culture flask and incubated at 37° C. in a 5% $CO_2$ incubator. After 2-3 days of incubation, additional medium was supplemented, and culturing continued for another 2-3 days to obtain immature dendritic cells (imDCs).

Example 2: Culture, Antigen Loading, and Treatment Method of mDC Cells (Mature Dendritic Cells)

imDC cells were collected and subjected to a maturation promoting culture. The required amount of cytokines was calculated based on the volume of the maturation promoting medium, and each maturation promoting cytokine was added to the serum-free medium (the maturation promoting cytokine composition included, but was not limited to rhGM-CSF, rhIL-4, rhTNF-α, etc., for example, as described in reference 1 above). Antigen polypeptides (specific selection can be found in the following examples) were dissolved according to their respective solubility properties, filtered through a membrane, and added to the imDC cell suspension. The imDC cells were then transferred to a culture flask and incubated at 37° C., in a 5% $CO_2$ incubator for further maturation.

On day 6 or 7 of the dendritic cell (DC) maturation culture, approximately one day prior to completion of the maturation process, PD-L1 monoclonal antibody and a DC cell agonist (specific examples are provided below) were added to the culture medium at the specified working concentration. The culture was incubated at 37° C. in a 5% $CO_2$ incubator for 1-6 hours. After incubation, the cells were examined under an inverted microscope to observe and record the morphological characteristics of the mature cells. The cells were then collected into centrifuge tubes, centrifuged, and the pellets were retained for quality control. The cell pellets were resuspended with a washing solution, and the total cell count was determined. Based on the count, an aliquot was taken for the assessment of live cell concentration, viability, and the expression of surface markers, including CD80, CD86, HLA-DR, CD83, and PD-L1. After sampling, the cells were centrifuged again, and the supernatant was discarded to prepare the cells for subsequent experiments.

Furthermore, Cryoprotectants were prepared according to clinical concentration standards, using the following composition: 40-90% CryoStor® CS10 cryopreservation solution, 5-30% human serum albumin solution, and 5-30% NaCl injection. Based on the results of cell counting, the cell pellets were resuspended in the cryoprotectant, and an appropriate sample was taken for safety testing. The cell suspension in the cryoprotectant was then accurately pipetted, aliquoted, and cryopreserved according to established protocols.

Example 3: Determination of PD-L1 Monoclonal Antibody Treatment on Enhancing mDC Cell Function In this example, two commercially available humanized monoclonal antibodies, Adebrelimab and Atezolizumab, were utilized. The experiment first confirmed whether co-incubation of PD-L1 monoclonal antibodies with mature dendritic cells (mDCs) effectively reduced the proportion of PD-L1-positive mDCs. Additionally, it was assessed whether this co-incubation enhanced the ability of mDCs to activate T cells.

Figure 7:
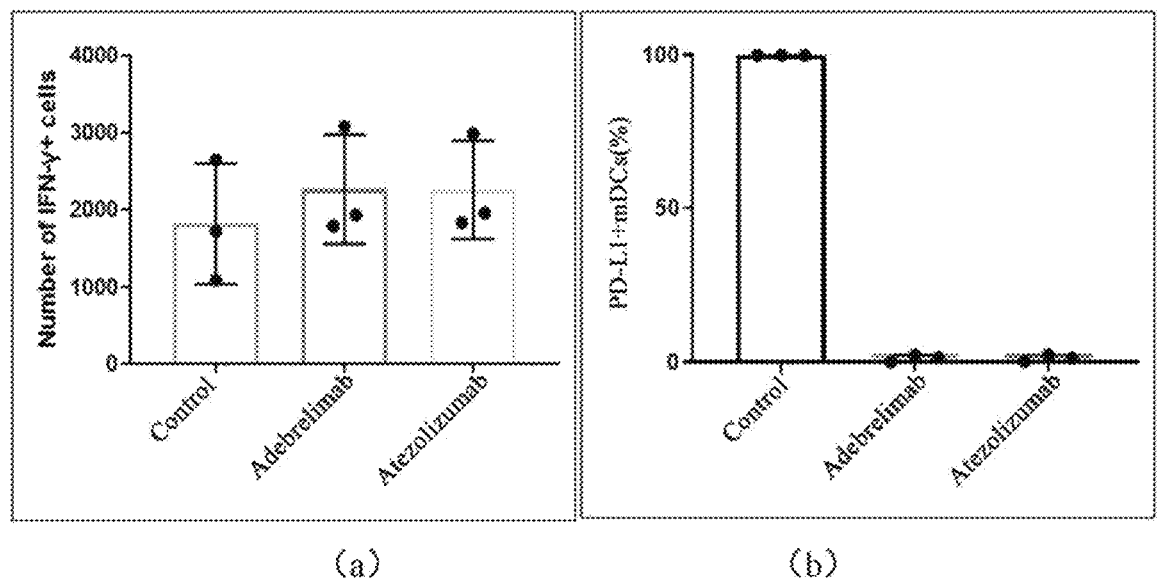
FIG. 7 shows the comparison of the ability level of dendritic cells to activate T cells, and the proportion of PD-L1+ dendritic cells between the control group and the PD-L1 monoclonal antibody treatment group in Example 3.

Experimental method: using the methods described in Examples 1 and 2, monocytes from HLA-A*02:01 subtype healthy donors were cultured in vitro to obtain imDC cells. These imDCs were then loaded with cytomegalovirus CMV polypeptides and subjected maturation promoting culture. The cells were divided into the following experimental groups for PD-L1 antibody treatment: A. control (without PD-L1 antibody in the culture system); B. Adebrelimab treatment; C. Atezolizumab treatment. For both treatment, the PD-L1 antibodies were added to the culture system one day prior to completion of mDC cell culture and incubated at 37° C. for 3 hours. After incubation, the mature dendritic cells (mDCs) were collected, washed, and subjected to cell counting and viability testing, along with flow cytometric analysis of cell phenotypes. The blocking effect of PD-L1 molecules on the surface of DC was analyzed, and the ability of mDC cells to activate T cells was assessed using Elispot. The results of the three batches of experiments are shown in Table 1 and FIG. 7 (a) (b).

TABLE 1 statistics of mDC cell detection data in the control group and PD-L1 monoclonal antibody treatment group

| Cell culture batch | PD-L1 monoclonal antibody (2 µg/mL) | PD-L1+ (%) | Number of cells secreting IFN-γ (per million) |
|---|---|---|---|
| $1^{st}$ | control group | 99.94 | 1095 |
|  | Adebrelimab group | 2.39 | 1780 |
|  | Atezolizumab group | 2.56 | 1825 |
| $2^{nd}$ | control group | 99.97 | 2640 |
|  | Adebrelimab group | 0.13 | 3080 |
|  | Atezolizumab group | 0.18 | 2985 |
| $3^{rd}$ | control group | 99.88 | 1715 |
|  | Adebrelimab group | 1.52 | 1925 |
|  | Atezolizumab group | 1.38 | 1950 |

The experimental results show that, at a PD-L1 monoclonal antibody concentration of 2 µg/mL, a significant difference exists in the T cell activation capacity of mDC cells between the control, the Adebrelimab treatment, and the Atezolizumab treatment. However, there is no significant difference between the two antibody treatments. The data on the number of T cells that secrete IFN-γ, activated by mDC cells analyzed using Elispot (FIG. 7(a)), shows that the average number of T cells in the conventional control group is 1817, the average number of T cells in the Adebrelimab group is 2261 (an increase of 24.4%), and the average number of T cells in the Atezolizumab group is 2253 (an increase of 24.0%). These results suggest that adding PD-L1 blockers (PD-L1 antibodies) to bind with PD-L1 on the surface of DC can enhances the ability of DCs to activate T cells. Regarding the blocking effect of PD-L1 monoclonal antibody (FIG. 7(b)), both treatments with monoclonal antibody achieve blocking effect of over 95% for PD-L1 on the surface of DC (the proportion of the mean number of PD-L1+DC cells is 99.9% in the control group, 1.3% in the Adebrelimab group, and 1.4% in the Atezolizumab group, respectively). Based on the analysis of the above indexes, it is confirmed that the blocking treatment by adding PD-L1 antibody before harvesting the mDC cells can effectively block PD-L1 and significantly enhance the functional activity of DC cells.

Figure 8:
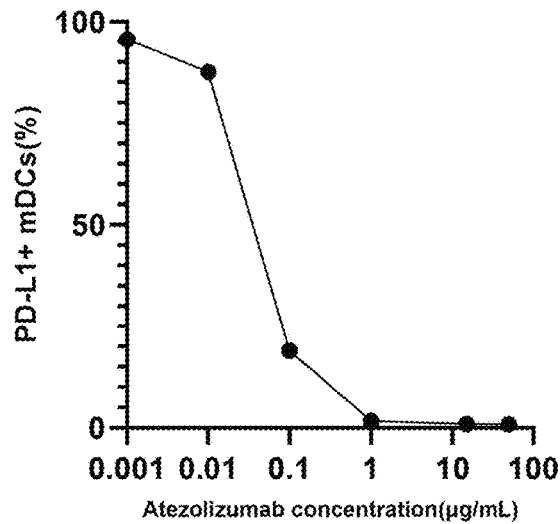
FIG. 8 shows the blocking effect of different concentrations of monoclonal antibodies on PD-L1 molecules on the surface of dendritic cells in Example 3.

Subsequently, the working concentration of the Atezolizumab monoclonal antibody was explored and optimized, and the blocking effect of monoclonal antibodies of different gradient concentrations for PD-L1 molecules on the surface of DC was tested. The results are shown in Table 2 and FIG. 8.

TABLE 2 detection results of the proportion of PD-L1+ mDC cells treated with different concentrations of PD-L1 monoclonal antibody

| Concentration of Atezolizumab monoclonal antibody (ug/mL) | proportion of PD-L1+ mDC cell (%) |
|---|---|
| 50 | 0.87 |
| 15 | 0.95 |
| 1 | 1.74 |
| 0.1 | 18.96 |
| 0.01 | 87.52 |
| 0.001 | 95.63 |

The results show that as the concentration of PD-L1 monoclonal antibody treatment increases, the proportion of PD-L1+ mDC cells decreases, showing an S-shaped curve; when the concentration of Atezolizumab monoclonal antibody is ≥1 µg/mL, it can block over 98% of PD-L1 molecules on the surface of mDC cells.

Example 4: Determination of DC Cell Agonist Treatment on Enhancing mDC Cell Function Five DC cell agonists were selected for this example: agonist A (OK432), agonist B (PolyI: C), agonist C (CD40 monoclonal antibody Cifurtilimab), agonist D (CD40 monoclonal antibody Mitazalimab), and agonist E (CD40L recombinant protein). The objective was to verify the effects of these different agonists on the quality and function of mature dendritic cells (mDCs).

Figure 9:
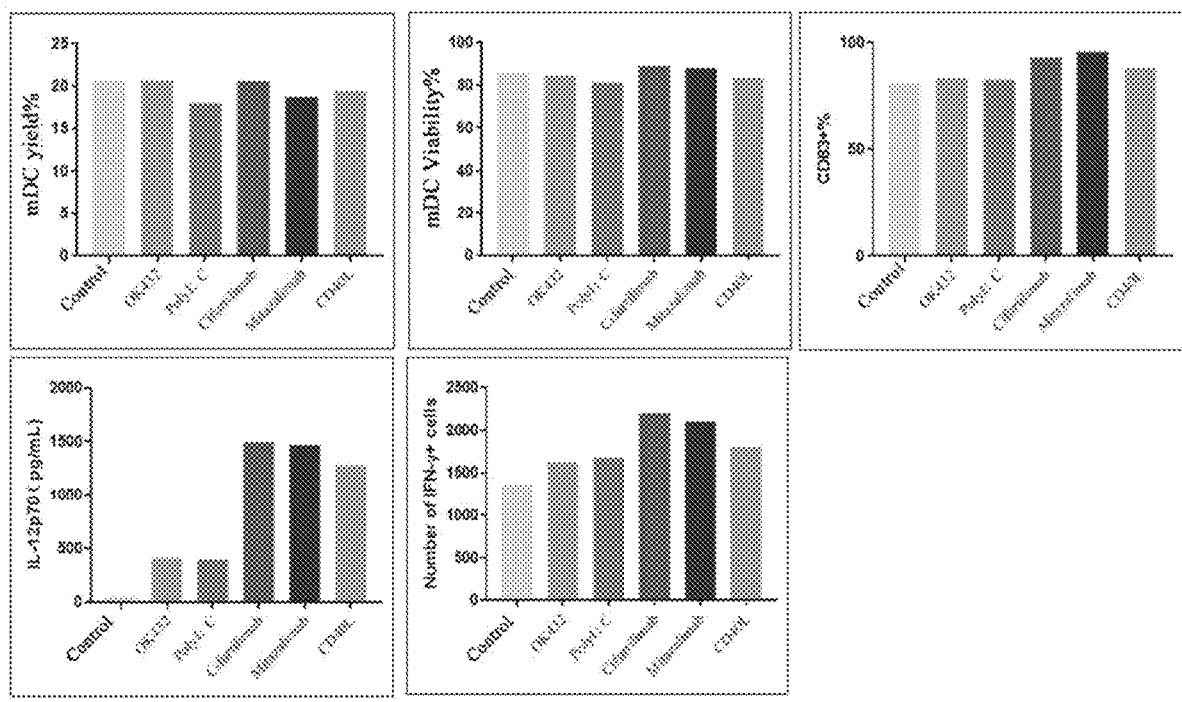
FIG. 9 shows the statistical detection results of the effects of different agonists on dendritic cells in Example 4.

Experimental method: Utilizing the methods described in Examples 1 and 2, monocytes from HLA-A*02:01 subtype healthy donors were cultured in vitro to obtain imDC cells, which were then loaded with cytomegalovirus CMV polypeptides and subjected to imDC cell maturation promoting culture. On the last day of dendritic cell maturation promoting culture, different agonists (working concentration of 2 µg/mL) were added to the culture medium according to the settings in the five experimental treatment groups mentioned above, alongside a control treatment (conventional method for maturation promoting culture) was set up. After culture, mDC cells were harvested and washed, followed by counting and survival rate determined, flow cytometry for phenotypic analysis, and Elispot assays to evaluate the ability of mDCs to activate T cells. Differences among groups were analyzed, comparing yield, survival rate, cytokine secretion and maturity, as well as antigen presentation to determine the impact of various agonists on the quality and function of mDC. The experimental results are shown in Table 3 and FIG. 9.

TABLE 3 statistics of mDC cell detection data in different agonist treatment groups

| Agonist | mDC yield (%) | survival rate of mDC (%) | CD83+ (%) | IL-12p70 (pg/mL) | Number of cells secreting IFN-γ (per million) |
|---|---|---|---|---|---|
| Control group | 20.7 | 85.8 | 81.00 | 50.0 | 1370 |
| Agonist A OK432 | 20.7 | 84.6 | 83.40 | 409.8 | 1630 |
| Agonist B PolyI: C | 18.0 | 81.3 | 82.64 | 396.9 | 1675 |
| Agonist C CD40 monoclonal antibody Cifurtilimab | 20.6 | 89.1 | 93.24 | 1491.7 | 2205 |
| Agonist D CD40 monoclonal antibody Mitazalimab | 18.7 | 88.1 | 95.73 | 1468.3 | 2105 |
| Agonist E CD40L recombinant protein | 19.4 | 83.7 | 88.20 | 874.4 | 1970 |

Figure 10:
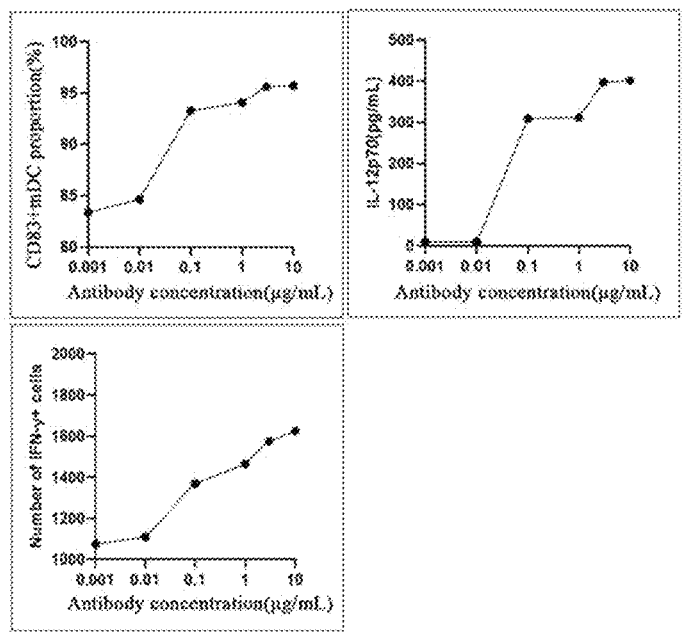
FIG. 10 shows the detection results of dendritic cells treated with CD40 monoclonal antibodies at different concentrations in Example 4.

The experimental results show that, compared to the control group, all five agonists can enhance the maturity, cytokine secretion, and T cell activation ability of DC cells to varying degrees. However, the treatment effect of CD40 monoclonal antibody and CD40L recombinant protein is significantly better than that of OK432 and PolyI: C. The Cifurtilimab group and Mitazalimab group show the most significant improvement in the ability of mDC cells to activate T cells, and there is no significant difference between the two antibody groups, followed by the improvement effect of CD40L. Subsequently, Cifurtilimab monoclonal antibodies were selected for exploration and optimization of working concentrations. The effects of different gradient concentrations of mAb on the maturation phenotype of DC cells (CD83 molecule), IL-12 cytokine secretion, and the enhancement of activated T cells were detected. The results are shown in Table 4 and FIG. 10.

TABLE 4 statistical analysis of data from mDC cells treated with CD40 mAb at various concentrations

| Concentration of Cifurtilimab mAb (µg/mL) | mDC yield (%) | mDC survival rate (%) | CD83+ (%) | IL-12p70 (pg/mL) | Number of cells secreting IFN-γ (per million) |
|---|---|---|---|---|---|
| 0.001 | 24.6 | 91.4% | 83.37 | 10.2 | 1075 |
| 0.01 | 24.1 | 90.6% | 84.64 | 10.0 | 1110 |
| 0.1 | 23.3 | 89.2% | 93.29 | 309.3 | 1370 |
| 1 | 24.9 | 91.4% | 94.09 | 312.3 | 1465 |
| 3 | 24.7 | 89.9% | 95.65 | 397.1 | 1575 |
| 10 | 22.7 | 88.0% | 95.73 | 401.5 | 1625 |

The results show that increasing concentrations of CD40 monoclonal antibody treatment, result in increased the secretion of CD83 and IL-12 cytokine, as well as enhanced T cell activation by mDCs, following an S-shaped curve; when the concentration of Cifurtilimab mAb is ≥0.1 µg/mL, it can significantly improve various functional and activity indices of the mDC cells.

Example 5: Combination Treatment of PD-L1 Monoclonal Antibody and DC Cell Agonist for Enhancing mDC Cell Function This example used PD-L1 monoclonal antibody (Atezolizumab), a combination of PD-L1 monoclonal antibody (Atezolizumab) and CD40 monoclonal antibody (Cifurtilimab), and PD-L1 and CD40 bispecific antibody for experiments (CD40-PD-L1-IgG4 bispecific antibody is a bispecific antibody comprising Fab and Fc synthesized by Sino Biological Inc. commissioned by the applicant, which comprises four polypeptide chains (i.e., two light chains and two heavy chains), and the two branches of the Fab bind to different antigens (i.e., CD40 and PD-L1) respectively. A CrossMab design was adopted, the constant region remained unchanged; the anti-PD-L1 light chain variable region was swapped with the anti-PD-L1 heavy chain variable region, so that the light chain of the anti-CD40 paired with the heavy chain of the anti-CD40, and the light chain of the anti-PD-L1 paired with the heavy chain of the anti-PD-L1. Among them, the sequences of CD40_L, CD40_H, PD-L1_L and PD-L1_H are shown as SEQ ID Nos. 1-4, respectively).

SEQ ID No.1 (CD40_L):
DIQMTQSPSSLSASVGDRVTIKCQASQSISSRLAWYQQKPGKPPKLLIYR ASTLASGVPSRFSGSGSGTDFTLTISSLQPEDVATYYCQCTGYGISWPIGGGTKVEIKRTVAAPSVFIFPPSDEQLKSGTASVVCLLNNFYPREAKVQWKVDNALQSGNSQESVTEQDSK DSTYSLSSTLTLSKADYEKHKVYACEVTHQGLSSPVTKSFNRGEC

SEQ ID No.2 (CD40_H):
QVQLVESGGGVVQPGRSLRLSCAASGFSFSSTYVCWVRQAPGKGLEWIACIYTGDGTNYSASWAKGRFTISKDSSKNTVYLQMNSLRAEDTAVYFCARPDITYGFAI NFWGPGTLVTVSSASTKGPSVFPLAPCSRSTSESTAALGCLVKDYFPEPVTVSWNSGALT SGVHTFPAVLQSSGLYSLSSVVTVPSSSLGTQTYTCNVDHKPSNTKVDKRVESKYGPPCP PCPAPEFEGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPRE PQVYTLPPCQEEMTKNQVSLWCLVKGFYPSDIAVEWESNGQPENNYKTTPPVLDSDGSF FLYSRLTVDKSRWQEGNVFSCSVMHEALHNHYTQKSLSLSLGK

SEQ ID No.3 (PD-L1_L):
QVQLVQSGAEVKKPGASVKVSCKASGYTFTSYWMHWVRQAPGQGLE WMGRIGPNSGFTSYNEKFKNRVTMTRDTSTSTVYMELSSLRSEDTAVYYCARGGSSYD YFDYWGQGTTVTVSSASVAAPSVFIFPPSDRKLKSGTASVVCLLNNFYPREAKVQWKV DNALQSGNSQESVTEQDSKDSTYSLSSTLTLSKADYEKHKVYACEVTHQGLSSPVTKSF NRGEC

SEQ ID No.4 (PD-L1_H):
DIVLTQSPASLAVSPGQRATITCRASESVSIHGTHLMHWYQQKPGQPPKL LIYAASNLESGVPARFSGSGSGTDFTLTINPVEAEDTANYYCQQSFEDPLTFGQGTKLEIK ASTKGPSVFPLAPCSRSTSESTAALGCLVEDYFPEPVTVSWNSGALTSGVHTFPAVLQSS GLYSLSSVVTVPSSSLGTQTYTCNVDHKPSNTKVDEKVES KYGPPCPPCPAPEFEGGPSV FLFPPKPKDTLMISRTPEVTCVVVDVSQEDPEVQFNWYVDGVEVHNAKTKPREEQFNST YRVVSVLTVLHQDWLNGKEYKCKVSNKGLPSSIEK TISKAKGQPREPQVCTLPPSQEEM TKNQVSLSCAVKGFYPSDIAVEWESNGQPENNYKTTPPVLDSDGSF FLVSRLTVDKSRW QEGNVFSCSVMHEALHNHYTQKSLSLSLGK

Figure 11:
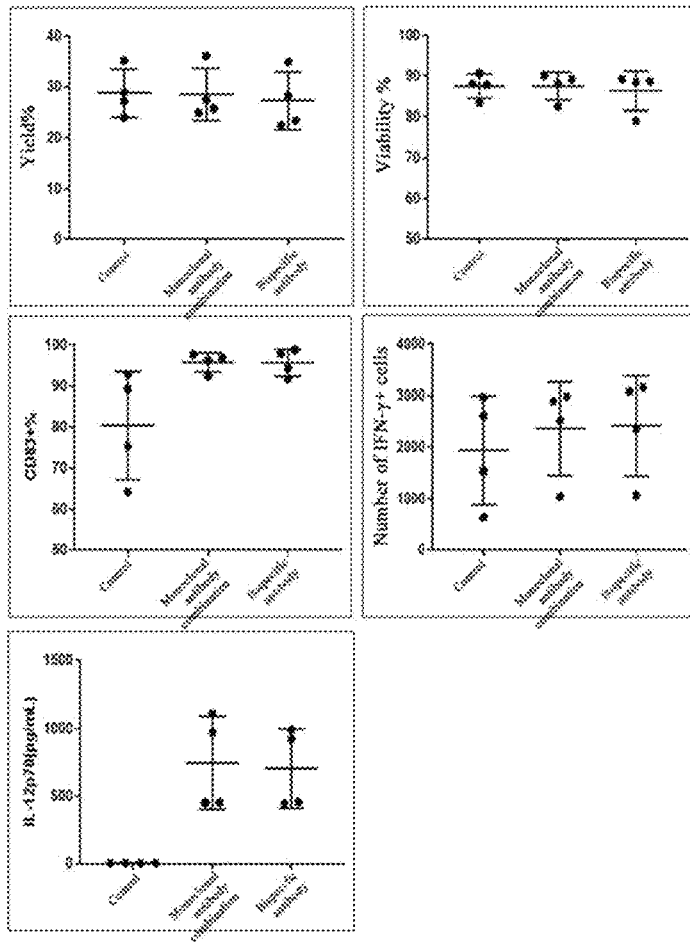
FIG. 11 shows the detection results of dendritic cells in each treatment group in Example 5.

Experimental method: using the methods described in Examples 1 and 2, monocytes from HLA-A*02:01 subtype healthy donors were cultured in vitro to obtain imDC cells, which were then loaded with cytomegalovirus CMV polypeptide and subjected to imDC cell maturation promoting culture, and the following experimental groups were set: A. control group (conventional DC culture maturation promoting cytokine combination plus PD-L1 monoclonal antibody treatment); B. combination of monoclonal antibodies (conventional DC culture maturation promoting cytokine combination plus PD-L1 monoclonal antibody and CD40 monoclonal antibody treatment); C. bispecific antibody group (conventional DC culture maturation promoting cytokine combination plus PD-L1×CD40 bispecific antibody). The antibody treatment method was: the corresponding antibody was added to the culture system and incubated at 37° C. for 3 hours before completion of the mDC cell culture. After incubation, the mDC cells were harvested and washed, followed by counting and survival rate detection, flow cytometry phenotype analysis, and Elispot assay for DC's ability to activate T cells. Differences among groups were analyzed, and yield, survival rate, cytokine secretion and maturity, as well as antigen presentation were compared to determine the impact of monoclonal and/or bispecific antibodies on the quality and function of the mDCs. The experimental results are shown in Table 5 and FIG. 11.

TABLE 5 statistical analysis of mDC cell detection data in each treatment group

| batch of Cell culture | Antibody combination | mDC yield (%) | survival rate of mDC (%) | CD83+ (%) | IL-12p70 (pg/mL) | Number of cells secreting IFN-γ (per million) |
|---|---|---|---|---|---|---|
| 1st | control | 27.1 | 88.1 | 92.69 | 4.1 | 2965 |
|  | monoclonal antibody combination | 27.4 | 90.1 | 96.88 | 450.2 | 2985 |
|  | bispecific antibody | 28.2 | 88.4 | 98.77 | 447.1 | 3080 |
| 2nd | control | 28.8 | 87.8 | 64.27 | 4.8 | 1535 |
|  | monoclonal antibody combination | 25.7 | 88.1 | 92.29 | 1215.9 | 2515 |
|  | bispecific antibody | 23.4 | 89.2 | 91.62 | 922.8 | 2350 |

TABLE 5-continued statistical analysis of mDC cell detection data in each treatment group

| batch of Cell culture | Antibody combination | mDC yield (%) | survival rate of mDC (%) | CD83+ (%) | IL-12p70 (pg/mL) | Number of cells secreting IFN-γ (per million) |
|---|---|---|---|---|---|---|
| 3rd | control | 35.2 | 90.6 | 89.18 | 5.7 | 640 |
| | monoclonal antibody combination | 36.1 | 89.2 | 97.63 | 1108.8 | 1045 |
| | bispecific antibody | 34.9 | 88.7 | 97.83 | 992.3 | 1065 |
| 4th | control | 24.0 | 83.4 | 75.24 | 5.0 | 2605 |
| | monoclonal antibody combination | 24.9 | 82.5 | 96.09 | 453.5 | 2890 |
| | bispecific antibody | 22.5 | 79.0 | 94.29 | 455.1 | 3155 |

The experimental results show that there is no significant difference in the yield and survival rate of mDC cells among groups of the monoclonal antibody combination, the bispecific antibody, and the control (the mean yield of the control group, the monoclonal antibody combination group, and the bispecific antibody group are 28.8%, 28.5%, and 27.3%, respectively; and the mean survival rate are 87.5%, 87.5%, and 86.3%, respectively). For the DC maturity index (represented by the proportion of CD83+ cells), the proportions of the mean CD83+ cells of the three groups are 80.35%, 95.72%, and 95.63%, respectively; indicating that adding combination of two types of monoclonal antibodies or adding a bispecific antibody can significantly improve the cell maturity of DC cells, with the increase rate of CD83 positive ratio being 19.1% and 19.0%, respectively. For the IL-12 cytokine secretion index, the mean values of the three groups are 4.9 pg/mL, 746.3 pg/mL, and 704.1 pg/mL, respectively, indicating that adding two types of monoclonal antibodies or adding a bispecific antibody can both significantly enhance the ability of mDC cells to secrete cytokines. There are also significant differences in the number of IFN-γ secreting T cells (reflecting the mDC antigen presentation ability) among the three groups, with mean values of 1936, 2359, and 2413, respectively. Compared with the control group, the monoclonal antibody combination group and the bispecific antibody group increase by 21.8% and 24.6%, respectively, indicating that addition of the monoclonal antibody combination or the bispecific antibody can both significantly enhance the ability of DC cells to activate T cells, leading to a significant increase in the number of IFN-γ secreting T cells. Based on the analysis of the above indexes, it is determined that co-culturing with PD-L1 mAb and CD40 mAb or PD-L1×CD40 bispecific antibody before DC harvesting can promote DC maturation, cytokine secretion, and T cell activation without significantly affecting the yield and survival rate of mDC cells.

Figure 12:
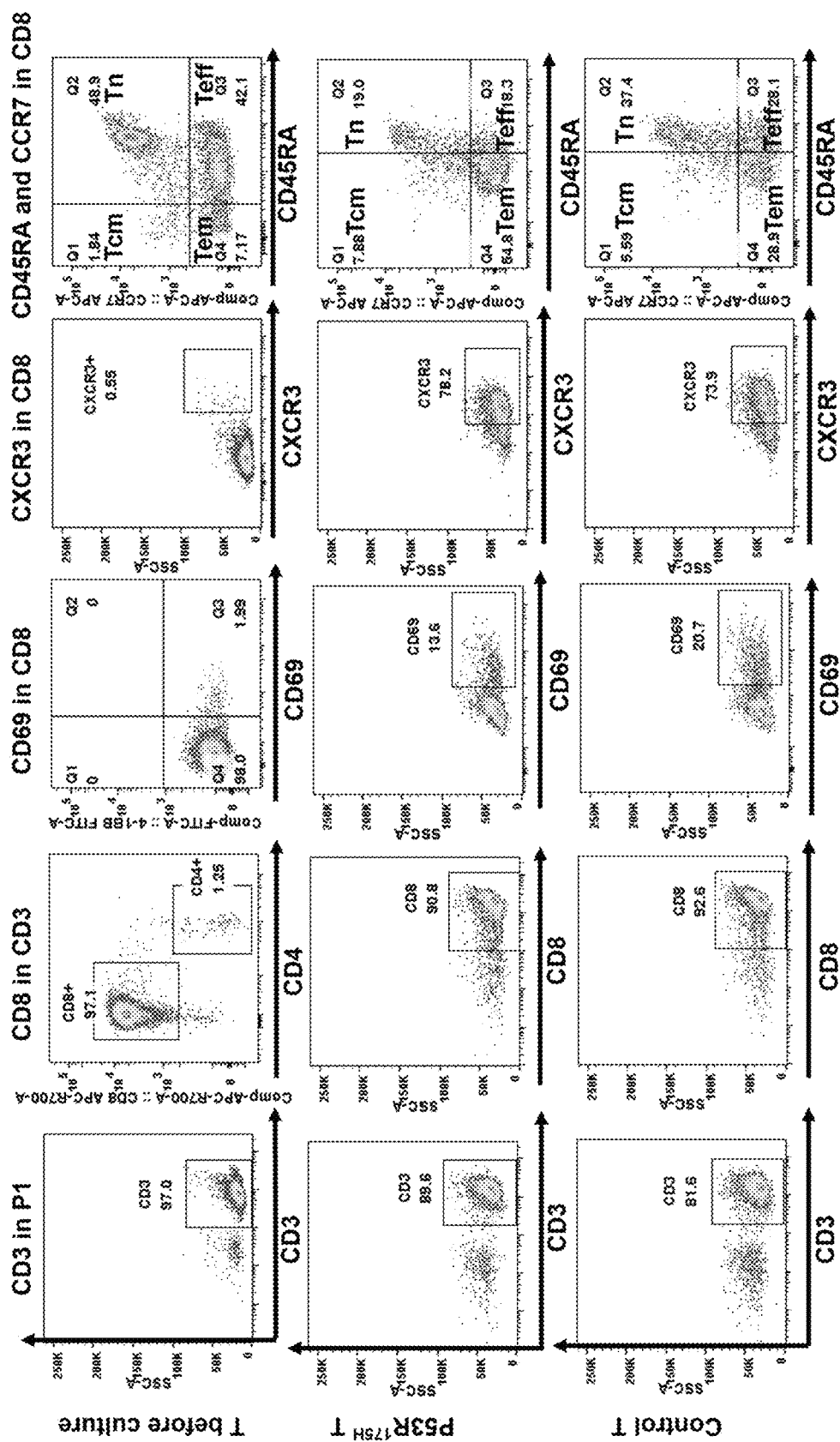
FIG. 12 shows the results of flow cytometry phenotype analysis of $CD8^+$ T cells, $P53^{R175H}$ T cells, and control T cells before culture.

Example 6: Dendritic Cells Activate Cytotoxic T Lymphocyte (CTL) and Induce their Tumor Cell Killing In Vitro In order to further demonstrate the ability of dendritic cells presenting tumor neoantigen to activate initial antigen-specific T cells (CTL cells), as well as the ability of activated CTL cells to specifically recognize and kill tumor target cells, the following experiments were designed:

KLE (a human endometrial carcinoma cell line expressing p53$^{R175H}$ neoantigen (HMTEVVRHC)) was used as the target cell, and CFPAC-1 (a human pancreatic cancer cell line not expressing the neoantigen) was used as the negative control cell (both cell lines are HLA-A*02:01 subtype). Monocytes from healthy donor of the same HLA subtype were cultured to obtain imDC cells, the imDC cells were then loaded with antigen (in this example, the antigen was p53$^{R175H}$ neoantigen polypeptide), and treated with CD40 antibody (Cifurtilimab, 2 µg/mL) and PD-L1 antibody (Atezolizumab, 2 µg/mL) during the maturation promoting stage to obtain mature dendritic cells (in the following examples, mature dendritic cells loaded with corresponding antigens and treated by this method are referred to as Neo-DC cells); and mature DC cells from the same source but without PD-L1 monoclonal antibody and CD40 monoclonal antibody treatment were taken as control cells (hereinafter referred to as Mock DC). The specific culture, loading, and antibody treatment methods are as described in Examples 1 and 2. CD8+ T cells from the same healthy donor were stimulated in vitro for 10 days by either Neo-DC or Mock DC cells to obtain p53$^{R175HT}$ T cells and control T cells. The composition of the CD8+T cells obtained from such in vitro stimulation was analyzed using flow cytometry, and the killing effect of these cells on target cells and negative control tumor cells was detected. The experimental results are shown in FIG. 12.

Results and analysis: the cell surface glycoprotein CD69 and chemokine receptor CXCR3 are important markers of effector T cell activation. Memory is one of the important biological characteristics of effector T cells, and the memory of T cells is formed during the proliferation and differentiation of antigen-specific T cell clones. After activation, Naive T cells (CCR7+CD45RA+) can differentiate into central memory T cells (CCR7+CD45RA−, $T_{CM}$), effector memory T cells (CCR7−CD45RA−, $T_{EM}$), and terminally differentiated T effector memory cells re-expressing CD45RA ($T_{eff}$, CCR7−CD45RA+). The reactive memory of T cells is mediated by $T_{CM}$, which can respond to antigen stimulation to proliferate and differentiate into effector cells. Protective memory is mediated by $T_{EM}$ and can migrate to peripheral tissues for immediate effects when needed. Flow cytometry analysis of CD8+ T cells derived from the same healthy donor and stimulated with either Neo-DCs or Mock DCs for 10 days, with pre-stimulation CD8+ T cells serving as a baseline sample. The results show that the CXCR3 expression level on the surface of CD8+ T cells before stimulation is 0.55%; after stimulation, the CXCR3 expression levels on the surface of the p53$^{R175H}$ T cells and control T cells reach 78.2% and 73.9%, both significantly higher than that before culture; indicating both Neo-DCs and Mock DCs can effectively activate CD8+ T cells. The experiment also found that the proportions of $T_{CM}$ cell subpopulation in p53$^{R175H}$ T and control T cells are 7.88% and 5.59%, respectively, both of which are significantly higher than 1.84% (before culture); the proportions of $T_{EM}$ cell subpopulation are 54.8% and 28.9%, both significantly higher than 7.19% (before culture), indicating that Neo-DC cells and Mock DCs can significantly induce CT8+ T cells to differentiate into central memory T cells and effector memory T cell subpopulations. However, Neo-DC cells have a stronger induction function, and the proportions of induced central memory T cells and effector memory T cell subpopulations are respectively 1.4 times and 1.9 times that of the control T cells.

Figure 13:
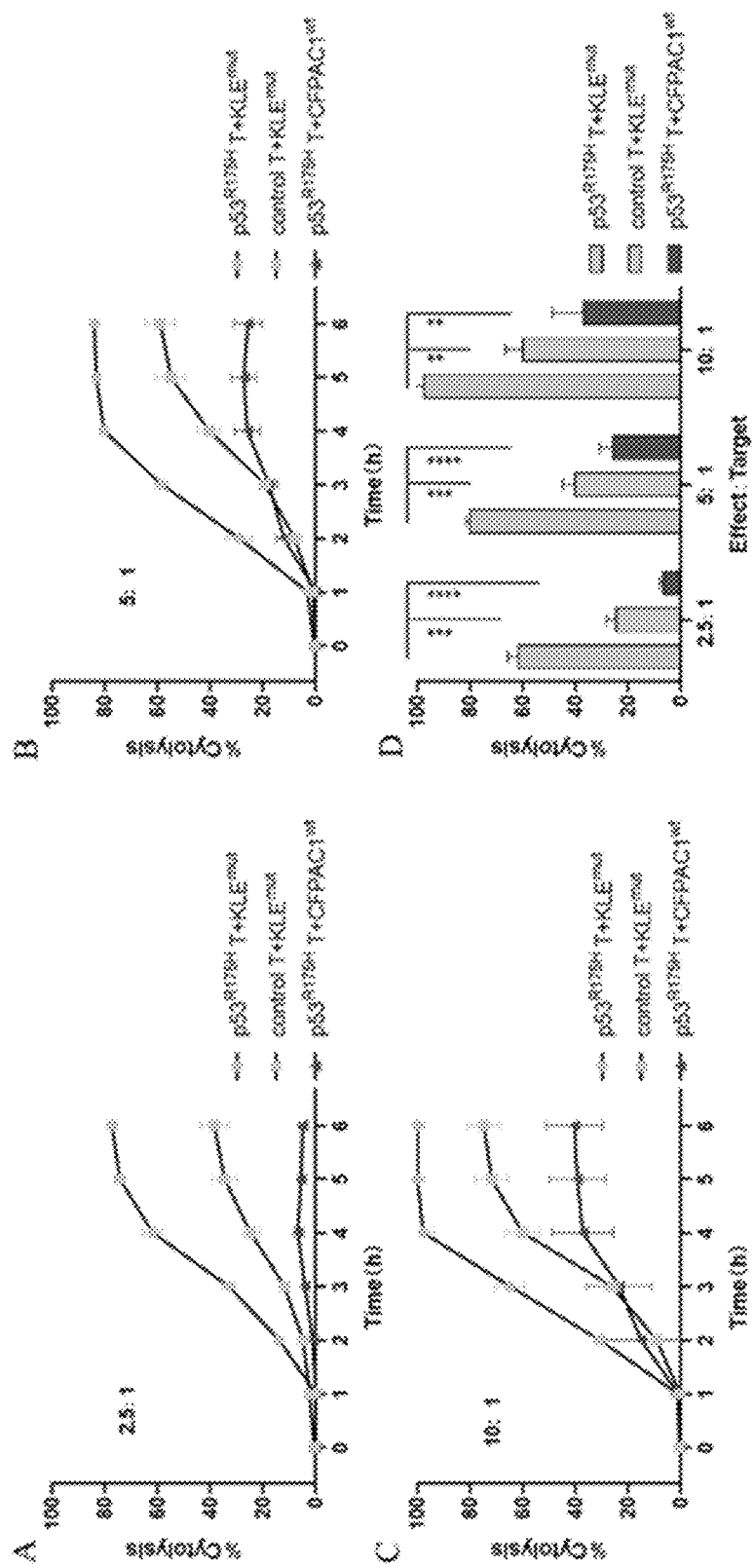
FIG. 13 shows the results of the killing effect of CTL cells on tumor cells detected by electrical impedance method.

In order to test the ability of effector T cells in p53$^{R175H}$ T and control T cells to recognize and kill tumor cells, KLE tumor cells expressing p53 neoantigen (abbreviated as KLE$^{mut}$) were used as target cells, while CFPAC-1 tumor cells expressing wild-type p53 were used as negative control cells (abbreviated as CFPAC-1$^{wt}$). The p53$^{R175H}$ T or control T cells obtained in the previous experiment were co-cultured with these two types of cells at different effector-to-target ratios of 2.5:1, 5:1, and 10:1, respectively. The death of the target cells was monitored using RTCA cell analyzer, and the killing activity of the T cells against tumor cells was calculated. The killing effect of CTL cells on tumor cells was detected using impedance method of the analyzer. Tumor cells (KLE$^{mut}$ or CFPAC-1$^{wt}$) with a density of 1×10$^4$ cells per 100 μL were placed into a 96 well resistance detection microplate. After 24 hours, different proportions of effector cells (p53$^{R175H}$ T or control T) were added to detect resistance changes in the system. The cytotoxicity of effector cells within 6 hours was calculated according to Cytolysis= (CI well without T-cells−CI experimental well)/CI well without T-cells×100%. The experimental results are shown in FIG. 13, wherein A: the effector-to-target ratio is 2.5:1; B: the effector-to-target ratio is 5:1; C: the effector-to-target ratio is 10:1; D: incubated for 4 hours. The obtained data were expressed as mean±standard deviation, and the differences among the mean values of different groups were evaluated using a student t-test (no statistical difference: ns; P<0.05: *, P<0.01: ; P<0.001: *; P<0.0001: ****).

Results and analysis: under three different effector-to-target ratios, p53$^{R175H}$ T can significantly kill tumor target cells KLE$^{mut}$ that express p53$^{R175H}$ antigen compared to control T, but the killing effect on CFPAC-1$^{wt}$ cells not expressing p53$^{R175H}$ antigen is not significant. Statistical analysis was conducted on the killing efficiency at the 4-hour time point of co-culture of effector cells and target cells. Under three different effector-to-target ratios (2.5:1, 5:1, 10:1), the killing efficiency of p53$^{R175H}$ T on target cells is respectively about 3 times, 2 times, and 1.5 times that of the control T, the differences are significant; the difference of killing efficiency between p53$^{R175H}$ T on the KLE$^{mut}$ target cells and the negative control CFPAC-1 cells is greater, with the former being about 12 times, 3 times, and 2.5 times higher than the latter, respectively. This indicates that p53$^{R175H}$ T has a significant ability to specifically recognize and kill target cells expressing p53$^{R175H}$ T antigen.

The above experimental results confirm that Neo-DC cells have a better ability to activate CD8+ T cells than Mock DC cells, obtaining antigen-specific T cells (CTL cells) with a higher proportion of effector memory T cell subpopulation, wherein the CTL cells have a strong ability to kill tumor cells.

Example 7. Pharmacodynamic Evaluation of Neo-DC Cells in the Subcutaneous Transplantation Model of CFPAC-1 Tumor in huPBMC-NCG Mice The CFPAC-1 human pancreatic cancer cells in logarithmic growth phase were collected and resuspended to a suspension of 1×10$^7$ cells/mL with DPBS, then subcutaneously inoculated 18 huPBMC-NCG mice (200 μL/mouse). When the average volume of tumors in mice reached the preset volume, the mice were randomly divided into 3 groups (G1-G3) based on their body weight and tumor volume, with 6 mice in each group. Each mouse was injected intraperitoneally with 100 μL PBMC of HLA-A*02:01 subtype for humanized immune system reconstruction. The day of injection was set as DO. At the same time, monocytes cells from the same donor source were used to prepare Neo-DC cells (in this example, the cells were mature dendritic cells loaded with neoantigen polypeptide generated by human pancreatic cancer cell KRAS$^{G12V}$ mutation and treated with CD40 antibody and PD-L1 antibody) and Mock DC cells (mature dendritic cells loaded with the same neoantigen polypeptide but not treated with CD40 antibody and PD-L1 antibody) according to the cell preparation process of Example 6. The mice in G1 group, which had undergone immune reconstitution, were injected subcutaneously with vehicle as a control; the G2 group mice were injected subcutaneously with Mock DC cells (100 L/mouse); the G3 group mice were injected subcutaneously with the same dose of Neo-DC cells. The administration method was subcutaneous two-point injection in the groin area of the hind legs of mice, with a frequency of administration on D14, D18, D22, and D30 after completing immune reconstitution, for a total of 4 doses. The pharmacodynamic evaluation of the test substance in the humanized huPBMC-NCG mouse model with subcutaneous transplantation of human pancreatic cancer cells CFPAC-1 was carried out based on the changes in tumor volume, body weight and other observation indexes during and after drug administration, as well as CBA analysis, GvHD scoring, and peripheral blood immune cell detection results.

Figure 14:
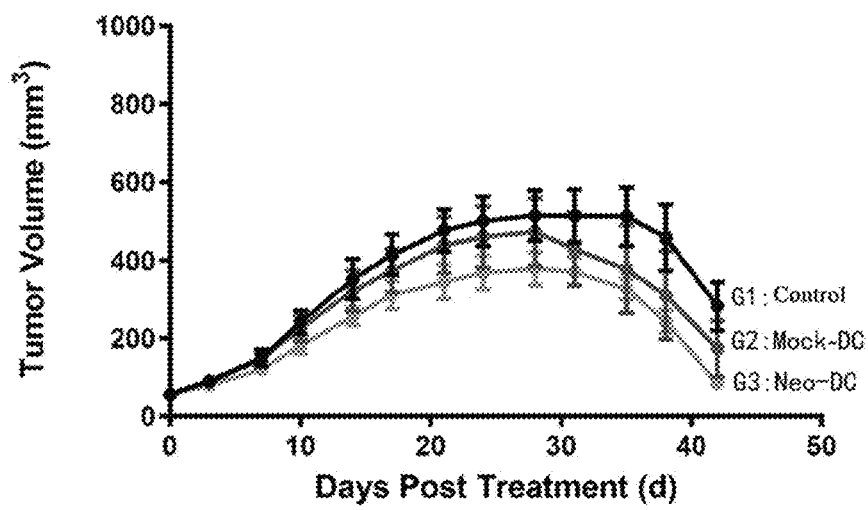
FIG. 14 shows the statistical chart of tumor volume changes in the humanized PBMC-NCG mice during the pharmacological experiment.

Results and analysis: during the experiment, flow cytometry of peripheral blood of the mice shows that more than half of the mice in each group have a proportion of hCD45+ immune cells greater than 10% in their peripheral blood; in hCD45+ immune cells, the proportion of T cells is greater than 99%, indicating the successful construction of the human PBMC immune reconstruction model. The data in FIG. 14 also shows that after the third dose, the average tumor volume of mice in the G3 group injected with Neo-DC increases and begins to decrease after reaching its peak on D28, from 379 mm$^3$ on D28 to 327 mm$^3$ on D35, and finally to 83 mm$^3$ on D42. The average tumor volume of mice in the G2 group injected with Mock DC also reaches its peak on D28 and then begins to decrease, reaching 429 mm$^3$ on D28, 376 mm$^3$ on D35, and 173 mm$^3$ on D42. The average tumor volume of mice in the G1 vehicle control group increases to a peak on D35, and a slow decrease is observed thereafter, with 512 mm$^3$ on D35, 458 mm$^3$ on D38, and 282 mm$^3$ on D42. It is speculated that this may be related to the stability of the reconstructed human immune system in the later stage of the experiment.

In summary, the results of this experiment show that repeated subcutaneous injections of Neo-DC cells and Mock DC cells in immunodeficiency mice reconstituted by human PBMC (at the same time, human pancreatic cancer cells formed subcutaneous tumorigenesis) both have an effect on tumor lesion growth inhibition, and there are significant statistical differences compared with vehicle control group, and the tumor growth inhibition effect of Neo-DC cells is more significant than that of Mock DC cells. This indicates that subcutaneous injection of Neo-DC cells at this dose has a stronger effect on inhibiting and treating human pancreatic cancer lesions in humanized huPBMC-NCG mice.

Figure 15:
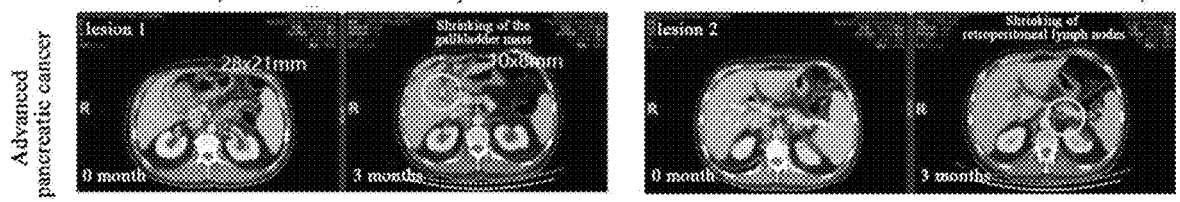
FIG. 15 shows the tumor imaging examination results of the subjects in Example 8.
Figure 15:
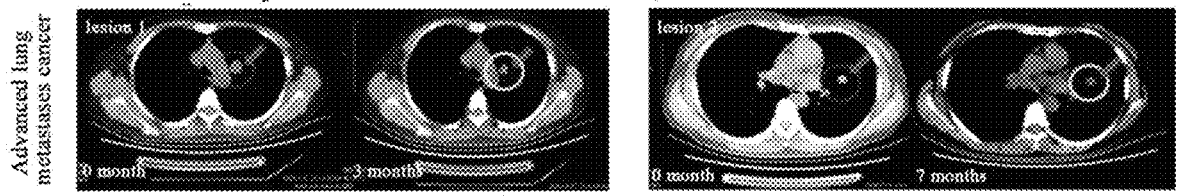
Figure 15:
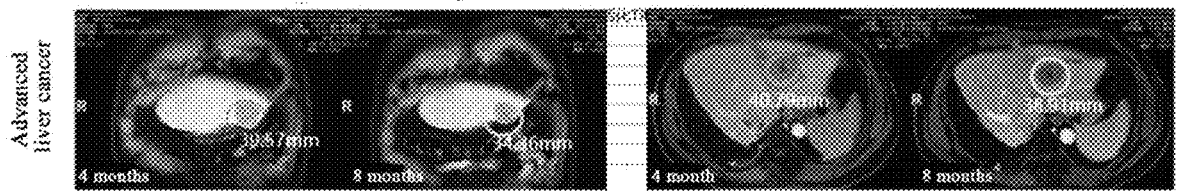

Example 8: Clinical Study on the Safety and Efficacy of Neo-DC Cell Therapy for Advanced Malignant Solid Tumors In a single-center, single-arm, prospective phase I clinical study, the subject population was patients with advanced malignant common solid tumors. Neo-DC cells (loaded with the patient's tumor antigen) were administered as a monotherapy or in combination with PD-1 monoclonal antibody following the patient's surgery. The dosage regimen was: the subjects received 5 subcutaneous injections of 1.0 mL each after surgery, with a two-week interval between the first three injections and a three weeks interval between the last two injections; if combined with PD-1 monoclonal antibody, PD-1 monoclonal antibody was subcutaneously injected every three weeks after surgery at the clinically recommended dose. There was a total of 3 subjects with advanced malignant solid tumors who completed treatment evaluation. Safety evaluation results: the only adverse reaction related to the drug was transient fever after cell injection, which disappeared within 1-2 days without treatment; all subjects did not experience any other unexpected adverse events, no serious adverse events, and no dose-limiting toxicity. Effectiveness evaluation results: all 3 subjects showed strong anti-tumor T cell immune response in their bodies. Among them, for one subject with advanced pancreatic cancer and systemic metastasis (case P1), after 3 months of treatment with Neo-DC cell injection combined with PD-1 monoclonal antibody, the lesion shrank by 64%, RECIST rating PR, followed up for 28 months; for a subject with lung metastasis from laryngeal cancer (case P2), after 3 months of treatment with Neo-DC cell injection monotherapy, the lesion shrank by 46%, RECIST rating PR, followed up for 36 months; for a subject with advanced multifocal hepatocellular carcinoma (Case P3), after 8 months of treatment with Neo-DC cell injection monotherapy combined with PD-1 monoclonal antibody, the lesion shrank by 13%, RECIST rating SD, followed up for 32 months. The experimental results are shown in FIG. 15. The clinical data has preliminarily demonstrated the safety and clinical efficacy of treatment with Neo-DC cell injection monotherapy or combined with PD-1 monoclonal antibody.

Figure 16:
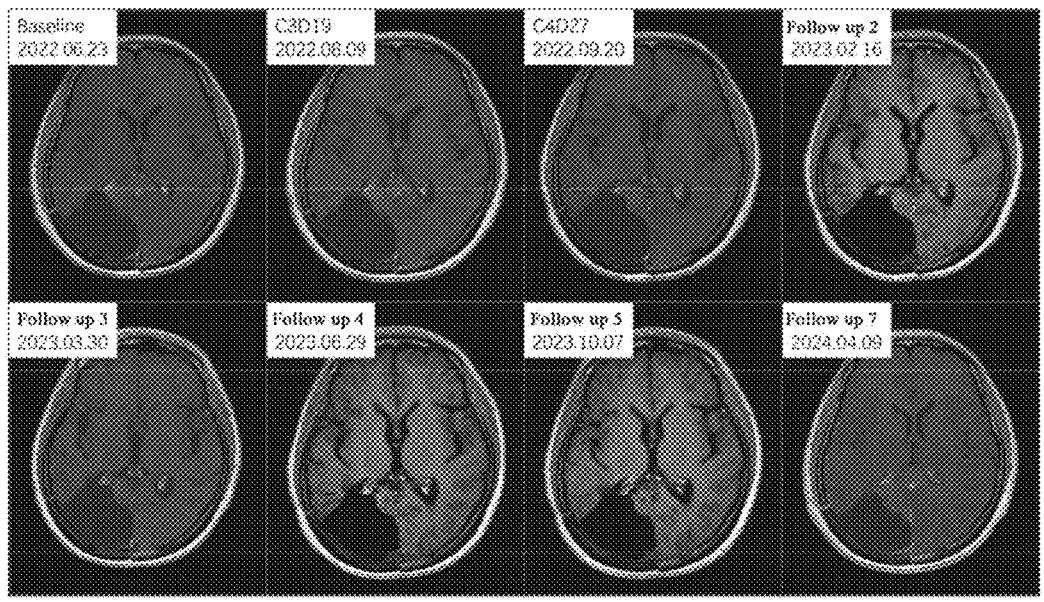
FIG. 16 shows the tumor imaging examination result of a subject in Example 9.
Figure 17:
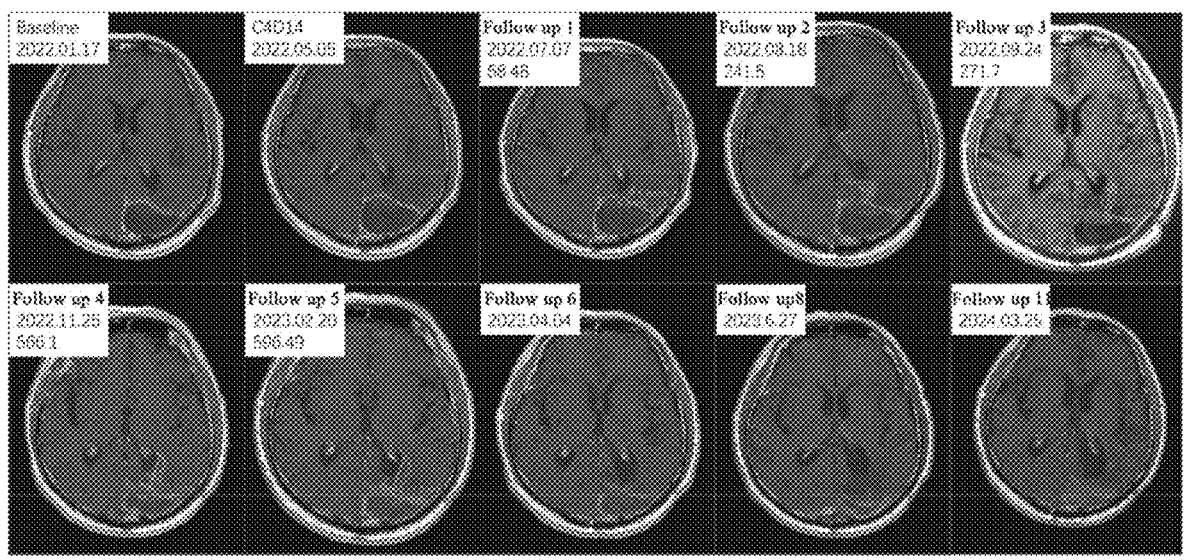
FIG. 17 shows the tumor imaging examination result of a subject in Example 9.

Example 9: Assessment of Safety and Preliminary Clinical Efficacy of Postoperative Adjuvant TMZ and Neo-DC Cell Injection in Patients with Glioblastoma In a single-center, single-arm, prospective phase I clinical study, several subjects aged 18-75 years with newly diagnosed primary glioblastoma multiforme (GBM) confirmed by histopathology were included. The newly diagnosed glioblastoma was WHO grade IV confirmed by histopathology examination, and wild-type IDH1 and IDH2 genes confirmed by molecular pathological diagnosis, with the tumor enhancement lesion resection exceeding 90%. After completing surgical resection, the subjects received standard treatment (SoC) and underwent 5-6 subcutaneous injections of Neo-DC cell (loaded with patient tumor antigen) injection during routine adjuvant TMZ chemotherapy. If progress is confirmed upon completion of injection treatment, continuation with PD-1 monoclonal antibody or bevacizumab treatment may be considered. A total of 10 subjects completed the full cycle treatment. Safety evaluation results: the only adverse reaction related to the drug was transient fever after cell injection, which disappeared within 1-2 days without treatment; all subjects did not experience any other unexpected adverse events, no serious adverse events, and no dose limiting toxicity. The clinical efficacy evaluation results as of Apr. 1, 2024: 8 subjects achieved sustained stability of the lesion (SD), with no change in the target lesion during the evaluation period, and a DCR of 80%; a subject maintained a long-term recurrence free survival status for 23 months (as shown in FIG. 16); a subject was followed up for 10.4 months on imaging progression, and late remission was achieved after 4 months of PD-1 monoclonal antibody therapy, iRANO rating CR, currently reaching 13 months (as shown in FIG. 17). The subjects exhibited significantly better survival rates compared to previous reports, where newly diagnosed primary GBM patients treated with standard therapy had a median overall survival of 14.6 months and a median progression-free survival of 6.9 months. This result preliminarily demonstrates the safety and clinical effectiveness of postoperative adjuvant treatment with TMZ and Neo-DC cell injection.

The above are only preferred examples of the present application and do not impose any form of limitation on the present application. Any technical skilled in the art may use the disclosed technical content to modify or change it into equivalent examples. However, any simple modifications, equivalent changes, or modifications made to the above examples based on the technical essence of the present application, as long as they do not depart from the content of the technical solution of the present application, still fall within the protection scope of the technical solution of the present application.

---

What is claimed is:

1. A novel dendritic cell preparation, comprising PD-L1 negative dendritic cells and dendritic cells with CD40 agonists bound to the cell surface, wherein the surface of PD-L1 negative dendritic cells in the preparation is bound to PD-L1 antibodies.

2. The dendritic cell preparation according to claim 1, wherein the proportion of PD-L1 negative dendritic cells is ≥80% of the total cells in the preparation, and the proportion of dendritic cells with CD40 agonists bound to the cell surface is ≥80% of the total cells in the preparation.

3. The novel dendritic cell preparation according to claim 1, wherein the proportion of dendritic cells with mature cell phenotype is ≥50% of the total cells in the preparation, or, the proportion is ≥80%.

4. The novel dendritic cell preparation according to claim 1, wherein each proportion of CD80, CD86, HLA-DR, and CD83 positive cells is ≥50% of the total cells in the preparation, or, the proportion is ≥80%.

5. The novel dendritic cell preparation according to claim 1, wherein the proportion of CD14 positive cells is ≤20% of the total cells in the preparation, or, the proportion is ≤10%, and/or
wherein the sum of proportions of CD3, CD19, and CD56 positive cells is ≤20% of the total cells in the preparation; or, the sum of proportions is ≤10%; or, the sum of proportions is ≤5%.

6. The novel dendritic cell preparation according to claim 1, wherein the PD-L1 antibody is selected from a PD-L1 monoclonal antibody or a multispecific antibody targeting PD-L1; wherein, the PD-L1 antibody is optionally selected from a monoclonal antibody Atezolizumab, Adebrelimab, Durvalumab, or Avelumab.

7. The novel dendritic cell preparation according to claim 1, wherein the CD40 agonist is selected from a CD40 agonist antibody or a CD40 ligand, wherein the CD40 agonist antibody comprises a CD40 monoclonal antibody and a multispecific antibody targeting CD40, and the CD40 ligand comprises a CD40L recombinant protein and a fusion protein; optionally, the CD40 agonist is selected from the group consisting of: monoclonal antibodies Mitazalimab, Cifurtilimab, Sotigalimab, and bispecific antibody Tecaginlimab.

8. The novel dendritic cell preparation according to claim 1, wherein the dendritic cells are derived from human peripheral blood monocytes.

9. The novel dendritic cell preparation according to claim 1,
wherein the dendritic cells in the preparation are further loaded with a tumor neoantigen or a tumor associated antigen,
optionally, wherein the preparation further comprises a cell cryopreservation solution, a cell protectant, or a pharmaceutically acceptable carrier.

10. A method for preparing novel dendritic cells, comprising:
blocking and activating dendritic cells with a treatment agent comprising PD-L1 antibodies and CD40 agonists.

11. The preparation method according to claim 10, wherein the PD-L1 antibody is selected from a PD-L1 monoclonal antibody or a multispecific antibody targeting PD-L1; optionally, the PD-L1 antibody is selected from monoclonal antibodies Atezolizumab, Adebrelimab, Durvalumab, or Avelumab; and wherein the CD40 agonist is selected from a CD40 agonist antibody or CD40 ligand, wherein the CD40 agonist antibody comprises a CD40 monoclonal antibody and a multispecific antibody targeting CD40, and the CD40 ligand comprises a CD40L recombinant protein or a fusion protein; optionally, the CD40 agonist is selected from the group consisting of: monoclonal antibodies Mitazalimab, Cifurtilimab, Sotigalimab, and bispecific antibody Tecaginlimab.

12. The preparation method according to claim 10, wherein a working concentration of the PD-L1 antibody is 1-50 µg/mL, and a working concentration of the CD40 agonist is 0.1-10 µg/mL, optionally, wherein a working concentration of the PD-L1 antibody is 10-20 µg/mL, and a working concentration of the CD40 agonist is 1-5 µg/mL.

13. The preparation method according to claim 10, wherein the blocking and activating comprises the step of adding the treatment agent to the dendritic cells and co-incubating them; optionally, a co-incubation condition is: a temperature of 35-38° C., and 5% $CO_2$.

14. The preparation method according to claim 10, further comprising a step of promoting maturation culture of dendritic cells, optionally, wherein the dendritic cells are subjected to blocking and activation treatment during or after the maturation promoting culture process; optionally, the blocking and activation treatment is performed 1 to 6 hours before completion of the culture.

15. The preparation method according to claim 10, further comprising a step of loading a tumor neoantigen and/or a tumor associated antigen onto the dendritic cells, optionally wherein the dendritic cells are loaded with tumor neoantigen and/or tumor associated antigen before the blocking and activation treatment.

16. The preparation method according to claim 10, wherein the dendritic cells subjected to the blocking and activation treatment are PD-L1 negative dendritic cells and dendritic cells with CD40 agonists bound to the cell surface.

17. A dendritic cell preparation prepared by the preparation method according to claim 16, wherein the proportion of the PD-L1 negative dendritic cells is ≥80% of the total cells in the preparation, and the proportion of dendritic cells with CD40 agonists bound to the cell surface is ≥80% of the total cells in the preparation.

* * * * *